(12) United States Patent
D'Souza et al.

(10) Patent No.: US 9,774,524 B2
(45) Date of Patent: Sep. 26, 2017

(54) METHOD AND APPARATUS FOR FAST REROUTE, CONTROL PLANE AND FORWARDING PLANE SYNCHRONIZATION

(71) Applicant: Telefonaktiebolaget L M Ericsson (publ), Stockholm (SE)

(72) Inventors: Pramodh D'Souza, San Jose, CA (US); Lars Ernstrom, Palo Alto, CA (US); Antoni Przygienda, Sunnyvale, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 162 days.

(21) Appl. No.: 14/624,454

(22) Filed: Feb. 17, 2015

(65) Prior Publication Data
US 2016/0241463 A1    Aug. 18, 2016

(51) Int. Cl.
H04L 12/703    (2013.01)
H04L 12/755    (2013.01)
H04L 12/707    (2013.01)

(52) U.S. Cl.
CPC ............ *H04L 45/28* (2013.01); *H04L 45/021* (2013.01); *H04L 45/22* (2013.01)

(58) Field of Classification Search
CPC ....... H04L 45/28; H04L 45/021; H04L 45/22; H04W 28/26
See application file for complete search history.

(56) References Cited

U.S. PATENT DOCUMENTS

| 2012/0239965 A1* | 9/2012 | Wu ...................... H04L 41/0663 714/4.1 |
| 2012/0250536 A1* | 10/2012 | Lafleur ................... H04L 43/10 370/252 |
| 2016/0119821 A1* | 4/2016 | Ramachandran ....... H04L 45/28 370/392 |

(Continued)

OTHER PUBLICATIONS

Ali, et al., "Node-ID Based Resource Reservation Protocol (RSVP) Hello: A Clarification Statement", Network Working Group, Network Working Group, Request for Comments: 4558, *The Internet Society*, (Jun. 2006), 8 pages.

(Continued)

*Primary Examiner* — Walter Divito
(74) *Attorney, Agent, or Firm* — Nicholson, De Vos, Webster & Elliot, LLP

(57) ABSTRACT

Exemplary methods include generating a first fast reroute (FRR) next hop (NH) comprising of a first primary next hop (PNH), a first secondary next hop (SNH), and a first attribute, wherein the first PNH and first SNH include forwarding information that causes traffic to be forwarded towards a second and third network device, respectively. The methods include sending a first request to a forwarding plane to generate a second FRR NH comprising of a second PNH, a second SNH, and a second attribute. The methods include updating contents of the first FRR NH, and sending a second request to the forwarding plane to update the second FRR NH, wherein the second request causes the forwarding plane to determine whether to revert back to using the second PNH based on whether the first attribute included in the second request is different from the second attribute of the second FRR NH.

27 Claims, 11 Drawing Sheets

(56) References Cited

U.S. PATENT DOCUMENTS

2016/0134591 A1* 5/2016 Liao ................... H04L 12/6418
726/15

OTHER PUBLICATIONS

Andersson, L., et al., "LDP Specification", *Network Working Group, Request for Comments: 5036*, (Oct. 2007), 136 pages.
Atlas, et al., "Basic Specification for IP Fast Reroute: Loop-Free Alternates", *RFC 5286, IP Fast Reroute: Loop-Free Alternates*, (Sep. 2008), 31 pages.
Awduche, D., et al., "RSVP-TE: Extensions to RSVP for LSP Tunnels", Network Working Group, Request for Comments: 3209, *The Internet Society*, http://tools.ietf.org/html/rfc3209, (Dec. 2001), 62 pages.
Babiarz, J., et al., "Configuration Guidelines for DiffServ Service Classes", Network Working Group, Request for Comments: 4594, *The Internet Society*, (Aug. 2006), 57 pages.
Baker, F., "A Differentiated Services Code Point (DSCP) for Capacity-Admitted Traffic", *Internet Engineering Task Force (IETF), Request for Comments: 5865, IETF Trust*, (May 2010), 14 pages.
Baker, F., et al., "Management Information Base for the Differentiated Services Architecture", Network Working Group, Request for Comments: 3289, *The Internet Society*, (May 2002), 116 pages.
Berger, L., "Generalized Multi-Protocol Label Switching (GMPLS) Signaling Resource ReSerVation Protocol-Traffic Engineering (RSVP-TE) Extensions", *Network Working Group, Request for Comments: 3473*, http://tools.ietf.org/html/rfc3473, (Jan. 2003), 42 pages.
Bernet, Y., et al., "An Informal Management Model for Diffserv Routers", Network Working Group, Request for Comments: 3290, *The Internet Society*, (May 2002), 56 pages.
Black, D., "Differentiated Services and Tunnels", Network Working Group, Request for Comments: 2983, *The Internet Society*, (Oct. 2000), 14 pages.
Black, D., et al., "Per Hop Behavior Identification Codes", Network Working Group, Request for Comments: 3140, *The Internet Society*, (Jun. 2001), 8 pages.
Blake, S., et al., "An Architecture for Differentiated Services", Network Working Group, Request for Comments 2475, *The Internet Society*, (Dec. 1998), 37 pages.
Borman, D., et al., "IPv6 Jumbograms", Network Working Group, Request for Comments: 2675, *The Internet Society*, (Aug. 1999), 9 pages.
Braden, et al., "Resource ReSerVation Protocol (RSVP)—Version 1 Functional Specification", *Network Working Group, Request for Comments: 2205*, (Sep. 1997), 113 pages.
Chan, K., et al., "Differentiated Services Quality of Service Policy Information Base", Network Working Group, Request for Comments: 3317, *The Internet Society*, (Mar. 2003), 96 pages.
Charny, A., et al., "Supplemental Information for the New Definition of the EF PHB (Expedited Forwarding Per-Hop Behavior)", Network Working Group, Request for Comments: 3247, *The Internet Society*, (Mar. 2002), 24 pages.
Coltun, et al., "OSPF for IPv6", *Network Working Group Request for Comments: 5340, IETF*, https://tools.ietf.org/html/rfc5340, (Jul. 2008), 95 pages.
Davie, B., et al., "An Expedited Forwarding PHB (Per-Hop Behavior)", Network Working Group, Request for Comments: 3246, *The Internet Society*, (Mar. 2002), 16 pages.
Deering, et al., "Internet Protocol, Version 6 (IPv6) Specification", Network Working Group, Request for Comments: 2460, *The Internet Society*, (Dec. 1998), 39 pages.
Eggert, L., et al., "Unicast UDP Usage Guidelines for Application Designers", *Network Working Group, Request for Comments: 5405, IETF Trust*, (Nov. 2008), 27 pages.
Fenner, B., et al., "Management Information Base for the User Datagram Protocol (UDP)", Network Working Group, Request for Comments: 4113, *The Internet Society*, (Jun. 2005), 19 pages.
Filsfils, C., et al., "Loop-Free Alternate (LFA) Applicability in Service Provider (SP) Networks", *Internet Engineering Task Force (IETF), RFC 6571*, (Jun. 2012), 35 pages.
Grossman, D. , "New Terminology and Clarifications for Diffserv", Network Working Group, Request for Comments: 3260, *The Internet Society*, (Apr. 2002), 10 pages.
Hedrick, C., "Routing Information Protocol", *Network Working Group, Request for Comments: 1058*, (Jun. 1988), 34 pages.
Heinanen, J., et al., "Assured Forwarding PHB Group", *The Internet Society*, RFC 2597, (Jun. 1999), 11 pages.
Hopps, C., "Analysis of an Equal-Cost Multi-Path Algorithm", Network Working Group, Request for Comments: 2992, *The Internet Society*, (Nov. 2000), 8 pages.
Housley, "Using Advanced Encryption Standard (AES) CCM Mode with IPsec Encapsulating Security Payload (ESP)", Network Working Group, Request for Comments: 4309, *The Internet Society*, (Dec. 2005), 14 pages.
Kent, et al., "Security Architecture for the Internet Protocol", Network Working Group, Request for Comments: 4301, *The Internet Society*, (Dec. 2005), 102 pages.
Kompella, et al., "Procedures for Modifying the Resource reSerVation Protocol (RSVP)", Network Working Group, Request for Comments: 3936, *The Internet Society*, (Oct. 2004), 8 pages.
Malkin, G., "RIP Version 2", Network Working Group, Request for Comments: 2453, *The Internet Society*, (Nov. 1998), 40 pages.
Malkin, et al., "RIPng for IPv6", *Network Working Group, Request for Comments: 2080*, (Jan. 1997), 20 pages.
Moy, J., "OSPF Version 2", Network Working Group, Request for Comments: 2328, *The Internet Society*, (Apr. 1998), 244 pages.
Nichols, K., et al., "Definition of Differentiated Services Per Domain Behaviors and Rules for their Specification", Network Working Group, Request for Comments: 3086, *The Internet Society*, (Apr. 2001), 24 pages.
Nichols, K., et al., "Definition of the Differentiated Services Field (DS Field) in the IPv4 and IPv6 Headers", Network Working Group, Request for Comments: 2474, *The Internet Society*, (Dec. 1998), 20 pages.
Oran, David, "OSI ISIS Intradomain Routing Protocol", *Network Working Group, Request for Comments: 1142*, (Feb. 1990), 157 pages.
Polk, et al., "A Resource Reservation Protocol (RSVP) Extension for the Reduction of Bandwidth of a Reservation Flow", Network Working Group, Request for Comments: 4495, *The Internet Society*, (May 2006), 22 pages.
Postel, J., "Transmission Control Protocol", *STD 7, RFC 793, Internet Standard*, Information Sciences Institute, USC, 4676 Admiralty Wy, Marina del Rey, CA 90291., (Sep. 1981), 91 pages.
Postel, J., "User Datagram Protocol", RFC 768, (Aug. 28, 1980), 3 pages.
Rekhter, Y., et al., "A Border Gateway Protocol 4 (BGP-4)", *Network Working Group, Request for Comments: 4271*, (Jan. 2006), 105 pages.
Rosen, et al., "BGP/MPLS IP Virtual Private Networks (VPNs)", Network Working Group, Request for Comments: 4364, *The Internet Society*, (Feb. 2006), 47 pages.
Shenker, S., et al., "Specification of Guaranteed Quality of Services", *Network Working Group; RFC 2212*; (Sep. 1997); 20 pages.
Socolofsky, T., et al., "A TCP/IP Tutorial", *Network Working Group, Request for Comments: 1180*, (Jan. 1991), 28 pages.
Thaler, et al., "Multipath Issues in Unicast and Multicast Next-Hop Selection", Network Working Group, Request for Comments: 2991, *The Internet Society*, (Nov. 2000), 9 pages.
Wroclawski, J., "Specification of the Controlled-Load Network Element Service", *Network Working Group, Request for Comments: 2211*, (Sep. 1997), 20 pages.
Wroclawski, J., "The Use of RSVP with IETF Integrated Services", *Network Working Group, Request for Comments: 2210*, (Sep. 1997), 34 pages.

* cited by examiner

```
                                                                    500
```

Generate a first FRR NH comprising of a primary next hop (PNH), a secondary next hop (SNH), and an attribute, wherein the PNH includes forwarding information that causes Internet Protocol (IP) traffic to be forwarded towards a second network device, and wherein the SNH includes forwarding information that causes the IP traffic to be forwarded towards a third network device
505

Send a request to a forwarding plane to generate a second FRR NH that corresponds to the first FRR NH, wherein the PNH, SNH, and attribute of the second FRR NH are generated based on the PNH, SNH, and attribute, respectively, of the first FRR NH included in the request
510

Receive notification from the forwarding plane indicating the second network device is not operational
515

Is the notification a false alarm?
520

Yes → Modify the attribute of the first FRR NH 535

Send a request to the forwarding plane to update the second FRR NH that corresponds to the first FRR NH, wherein the PNH, SNH, and attribute of the second FRR NH are updated based on the PNH, SNH, and modified attribute, respectively, of the first FRR NH included in the request, wherein the modified attribute causes the forwarding plane to revert back to using the PNH of the second FRR NH
540

No → Not modify the attribute of the first FRR NH 525

Send a request to the forwarding plane to update the second FRR NH that corresponds to the first FRR NH, wherein the PNH, SNH, and attribute of the second FRR NH are updated based on the PNH, SNH, and un-modified attribute, respectively, of the first FRR NH included in the request, wherein the un-modified attribute causes the forwarding plane NOT to revert back to using the PNH of the second FRR NH
530

Generate a FRR NH comprising of a primary next hop (PNH), a secondary next hop (SNH), and an attribute, wherein the PNH includes forwarding information that causes Internet Protocol (IP) traffic to be forwarded towards a second network device, and wherein the SNH includes forwarding information that causes the IP traffic to be forwarded towards a third network device
605

In response to detecting the second network device is not operational: 1) switch the FRR NH to use the SNH to forward IP traffic towards the third network device, and 2) send a notification to a control plane indicating the second network device is not operational
610

Maintain state information of whether the second network device is operational
615

Receive a request from the control plane to update the FRR NH entry, wherein the request includes a PNH, a SNH, and an attribute
620

Yes — Does the state information indicate the second network device is down?
625

No

Does the attribute in the request match the attribute of the FRR NH?
630

Yes

Update the contents of the FRR NH with the PNH and SNH included in the request, without switching the FRR NH back to using the PNH for forwarding the IP traffic towards the second network device
635

No

Update the content of the FRR NH with the PNH, SNH, and attribute included in the request, and switch the FRR NH back to using the PNH for forwarding the IP traffic towards the second network device
640

```
Generate a first FRR NH comprising of a first primary next hop (PNH), a first secondary next hop
(SNH), and a first attribute, wherein the first PNH includes forwarding information that causes
Internet Protocol (IP) traffic to be forwarded towards a second network device via a plurality of
paths, and wherein the first SNH includes forwarding information that causes the IP traffic to be
forwarded towards a third network device
705
```

```
Send a first request to a forwarding plane to generate a second FRR NH comprising of a second
PNH, a second SNH, and a second attribute, wherein the second PNH, the second SNH, and the
second attribute are to be generated based on the first PNH, the first SNH, and the first attribute,
respectively, included in the first request
710
```

```
Update the contents of the first FRR NH
715
```

```
Send a second request to the forwarding plane to update the second FRR NH, wherein the
second PNH and the second SNH are to be updated based on the first PNH and the first SNH,
respectively, included in the second request, wherein the second request causes the forwarding
plane to determine whether to revert back to using the second PNH for forwarding the IP traffic
towards the second network device based on whether the first attribute included in the second
request is different from the second attribute of the second FRR NH
720
```

Generate a FRR NH comprising of a primary next hop (PNH), a secondary next hop (SNH), and an attribute, wherein the PNH includes forwarding information that causes Internet Protocol (IP) traffic to be forwarded towards a second network device, wherein the SNH includes forwarding information that causes the IP traffic to be forwarded towards a third network device
805

↓

Detect the second network device is not operational
810

↓

In response to detecting the second network device is not operational, cause the FRR NH to switch from using the PNH for forwarding the IP traffic towards the second network device to using the SNH for forwarding the IP traffic towards the third network device
815

↓

Receive a request from a control plane to update the FRR NH, wherein the request includes an attribute
820

↓

In response to receiving the request to update the FRR NH, determine whether to continue using the SNH for forwarding the IP traffic towards the third network device or to revert back to using the PNH for forwarding the IP traffic towards the second network device based whether the attribute included in the request matches the attribute of the FRR NH
825

FIG. 8

Fig. 9C
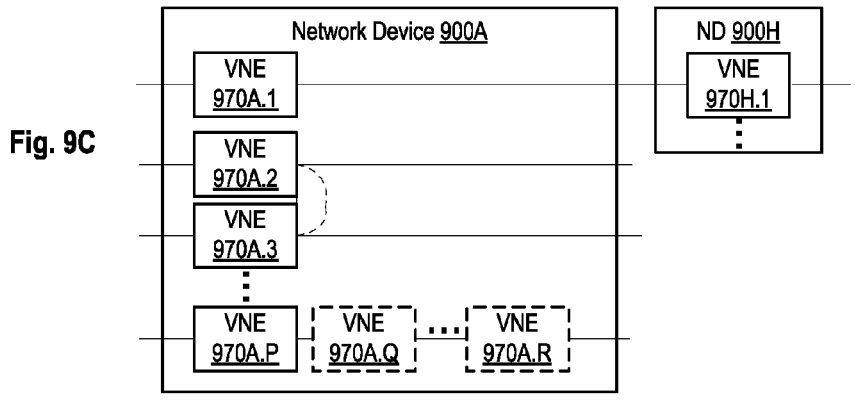
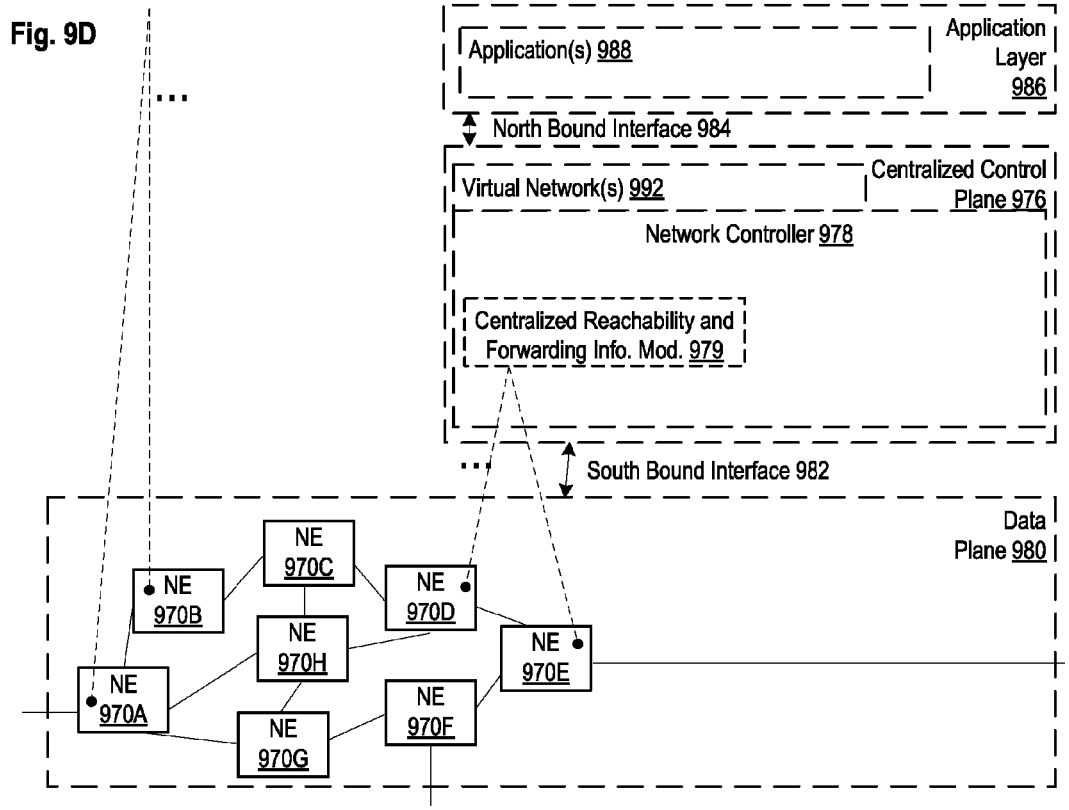
Fig. 9D
Fig. 9E
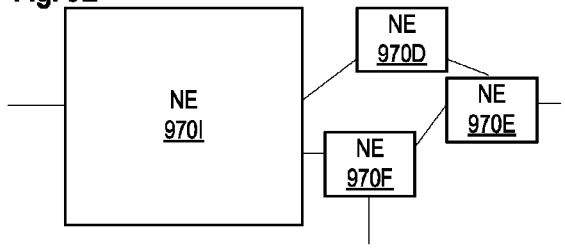
Fig. 9F
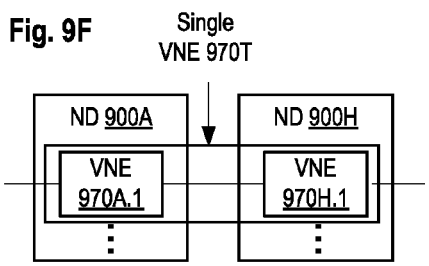

METHOD AND APPARATUS FOR FAST REROUTE, CONTROL PLANE AND FORWARDING PLANE SYNCHRONIZATION

FIELD

Embodiments of the invention relate to the field of packet networks, and more specifically, to the synchronization of control planes and forwarding planes.

BACKGROUND

Internet Protocol (IP) and Multiprotocol Label Switching (MPLS) Fast Reroute (FRR) technologies address the problem of slow convergence of routing protocols across networks. The conventional approach is to switch traffic from the primary path to a prepared backup path when network failures occur. In existing technologies, such as Open Shortest Path First (OSPF), Intermediate System-to-Intermediate System (ISIS), Label Distribution Protocol (/LDP), Loop Free Alternate (LFA) FRR, Border Gateway Protocol (BGP) FRR, Prefix Independent Convergence (PIC), network information is gathered with the help of a routing/signaling protocol and subsequently, backup paths necessary to prepare for failures of adjacent links or nodes are computed, and pre-provisioned in the forwarding plane. With help of this information, the forwarding plane is able to react to a failure event by switching from a primary to a backup path without waiting for the routing protocol to gather updated network information and for it to reconverge. Multi chassis solutions implementing Multi chassis Link Aggregation Group (LAG) in Active—Standby configurations exist as well, allowing one of the chassis to redirect traffic to the other quickly when a failure occurs.

A routing system consists of 1) an entity for managing the Routing Information Base (RIB), herein referred to as a RIB, 2) routing protocol entities, herein referred to as routing clients, and 3) forwarding entities. Routing clients manage routes, derived from the information gathered by a routing protocol and/or a dependent route queried from RIB through prefix and next-hop registrations. Routing clients may also modify routes based on failure event notifications in order to converge faster, as compared to relying on the routing protocol itself or on RIB updates. The RIB and routing clients are typically considered to be in the "control plane" while the forwarding entities are in the "forwarding plane" (also commonly referred to as the "data plane").

Routing clients check for reachability before adding their routes and removing/updating them when there is no reachability. Routing clients, however, delegate management of changes to the underlying routes to the RIB. Different routing clients adding routes may end up sharing next-hops in RIB although the routes and paths are different. In such cases, once the RIB has created a next-hop for a route and downloaded it to the forwarding entities, any subsequent routes added that use the same next-hop do not require the next-hop to be re-downloaded again. For example, BGP may add a million routes to a given next-hop. The next-hop, however, is created and downloaded once and subsequently all new routes are downloaded pointing to this next-hop.

As described above, once the RIB has created a next-hop for a route and downloaded it to the forwarding entities, any subsequent routes added that use the same next-hop do not require the next-hop to be re-downloaded again. The RIB, however, does not have the information to determine, at the time of the route addition/update, if there has been a flap or failure event detected in the data plane resulting in a switch-over since the last time the route was updated. Further, although routing clients delegate management of changes to the underlying routes to RIB, there is no mechanism through which the RIB can learn of the flaps or failure notifications that a routing protocol client receives to perform this correctly. Such limitations result in problems where the control plane and data plane go out of sync after a fast switch-over in the data plane resulting in 1) traffic loss due to traffic inadvertently being reverted to a failed primary nexthop, or 2) the forwarding plane staying on the backup path although the primary path is restored on the control plane.

SUMMARY

Exemplary methods performed by a first network device for maintaining a plurality of fast reroute (FRR) next hops (NHs), wherein the first network device is communicatively coupled to a plurality of other network devices, include generating a first FRR NH comprising of a first primary next hop (PNH), a first secondary next hop (SNH), and a first attribute, wherein the first PNH includes forwarding information that causes Internet Protocol (IP) traffic to be forwarded towards a second network device via a plurality of paths, and wherein the first SNH includes forwarding information that causes the IP traffic to be forwarded towards a third network device.

In one embodiment, the methods include sending a first request to a forwarding plane to generate a second FRR NH comprising of a second PNH, a second SNH, and a second attribute, wherein the second PNH, the second SNH, and the second attribute are to be generated based on the first PNH, the first SNH, and the first attribute, respectively, included in the first request. In one embodiment, the methods include updating contents of the first FRR NH, and sending a second request to the forwarding plane to update the second FRR NH, wherein the second PNH and the second SNH are to be updated based on the first PNH and the first SNH, respectively, included in the second request, wherein the second request causes the forwarding plane to determine whether to revert back to using the second PNH for forwarding the IP traffic towards the second network device based on whether the first attribute included in the second request is different from the second attribute of the second FRR NH.

According to one embodiment, updating the contents of the first FRR NH comprises receiving a notification from the forwarding plane indicating the second network device is not operational, in response to determining the notification is not a false alarm, maintaining the first attribute without updating it with a different value, and in response to determining the IP traffic cannot be forwarded to the second network device via a first path of the plurality of paths, updating the first PNH to avoid forwarding the IP traffic to the second network device via the first path, wherein updating the first PNH causes the second request to be sent to the forwarding plane. In one such embodiment, sending the second request comprises sending second request that includes the first attribute that has not been updated with the different value, wherein the second request causes the forwarding plane, in response to determining the first attribute included in the second request is not different from the second attribute of the second FRR NH, to not revert back to using the second PNH for forwarding the IP traffic towards the second network device.

In one embodiment, updating the contents of the first FRR NH comprises receiving a notification from the forwarding plane indicating the second network device is not operational, and in response to determining the notification is a false alarm, updating the first attribute with a different value, wherein updating the first attribute with a different value causes the second request to be sent to the forwarding plane. In one such embodiment, sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

According to one embodiment, updating the first attribute with the different value comprises receiving a fourth request to update the first FRR NH, wherein the fourth request includes a third attribute that is newer than the first attribute, in response to determining the third attribute is newer than the first attribute, updating the first attribute with the third attribute, receiving a fifth request to update the first FRR NH, wherein the fifth request includes a fourth attribute that is not newer than the first attribute, and in response to determining the fourth attribute is not newer than the first attribute, maintaining the first attribute without updating it with the fourth attribute. In one such embodiment, sending the second request that includes the first attribute that has been updated with the different value comprises sending the second request that includes the first attribute that has been updated with the third attribute.

In one embodiment, updating the contents of the first FRR NH comprises after a hardware failover, updating the first attribute with a different value, wherein updating the first attribute with a different value causes the second request to be sent to the forwarding plane. In one such embodiment, sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

Exemplary methods performed by a first network device for maintaining a plurality of fast reroute (FRR) next hops (NHs), wherein the first network device is communicatively coupled to a plurality of other network devices, include generating a FRR NH comprising of a primary next hop (PNH), a secondary next hop (SNH), and an attribute, wherein the PNH includes forwarding information that causes Internet Protocol (IP) traffic to be forwarded towards a second network device, wherein the SNH includes forwarding information that causes the IP traffic to be forwarded towards a third network device.

In one embodiment, the methods include detecting the second network device is not operational, and in response to detecting the second network device is not operational, causing the FRR NH to switch from using the PNH for forwarding the IP traffic towards the second network device to using the SNH for forwarding the IP traffic towards the third network device. The methods further include receiving a request from a control plane to update the FRR NH, wherein the request includes an attribute, and in response to receiving the request to update the FRR NH, determining whether to continue using the SNH for forwarding the IP traffic towards the third network device or to revert back to using the PNH for forwarding the IP traffic towards the second network device based whether the attribute included in the request matches the attribute of the FRR NH.

In one embodiment, the methods further include in response to detecting the second network device is not operational, sending a notification to the control plane indicating the second network device is not operational, wherein the control plane determines that the notification is not a false alarm and sends the request to update the FRR NH which includes the attribute that matches the attribute of the FRR NH. In one such embodiment, the methods include in response to determining the request to update the FRR NH includes the attribute that matches the attribute of the FRR NH, determining not to cause the FRR NH to revert from using the SNH for forwarding the IP traffic towards the third network device back to using the PNH for forwarding the IP traffic towards the second network device.

In one embodiment, the methods include in response to detecting the second network device is not operational, sending a notification to the control plane indicating the second network device is not operational, wherein the control plane determines that the notification is a false alarm and sends the request to update the FRR NH which includes the attribute that does not match the attribute of the FRR NH. In one such embodiment, the methods include in response to determining the request to update the FRR NH includes the attribute that does not match the attribute of the FRR NH, determining to cause the FRR NH to revert from using the SNH for forwarding the IP traffic towards the third network device back to using the PNH for forwarding the IP traffic towards the second network device.

In one embodiment, the methods include maintaining state information of the second network device, wherein the state information indicates whether the second network device is operational. In one such embodiment, the methods include in response to receiving the request to update the FRR NH, determining whether to continue using the SNH for forwarding the IP traffic towards the third network device or to revert back to using the PNH for forwarding the IP traffic towards the second network device is further based whether the state information indicates the second network device is operational.

BRIEF DESCRIPTION OF THE DRAWINGS

The invention may best be understood by referring to the following description and accompanying drawings that are used to illustrate embodiments of the invention. In the drawings:

FIG. 5 is a flow diagram illustrating a method for maintaining FRR NHs according to one embodiment.

FIG. 6 is a flow diagram illustrating a method for maintaining FRR NHs according to one embodiment.

FIG. 7 is a flow diagram illustrating a method for maintaining FRR NHs according to one embodiment.

FIG. 8 is a flow diagram illustrating a method for maintaining FRR NHs according to one embodiment.

FIG. 9C illustrates various exemplary ways in which virtual network elements (VNEs) may be coupled according to some embodiments of the invention.

FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9E illustrates the simple case of where each of the NDs implements a single NE, but a centralized control plane has abstracted multiple of the NEs in different NDs into (to represent) a single NE in one of the virtual network(s), according to some embodiments of the invention.

FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1:
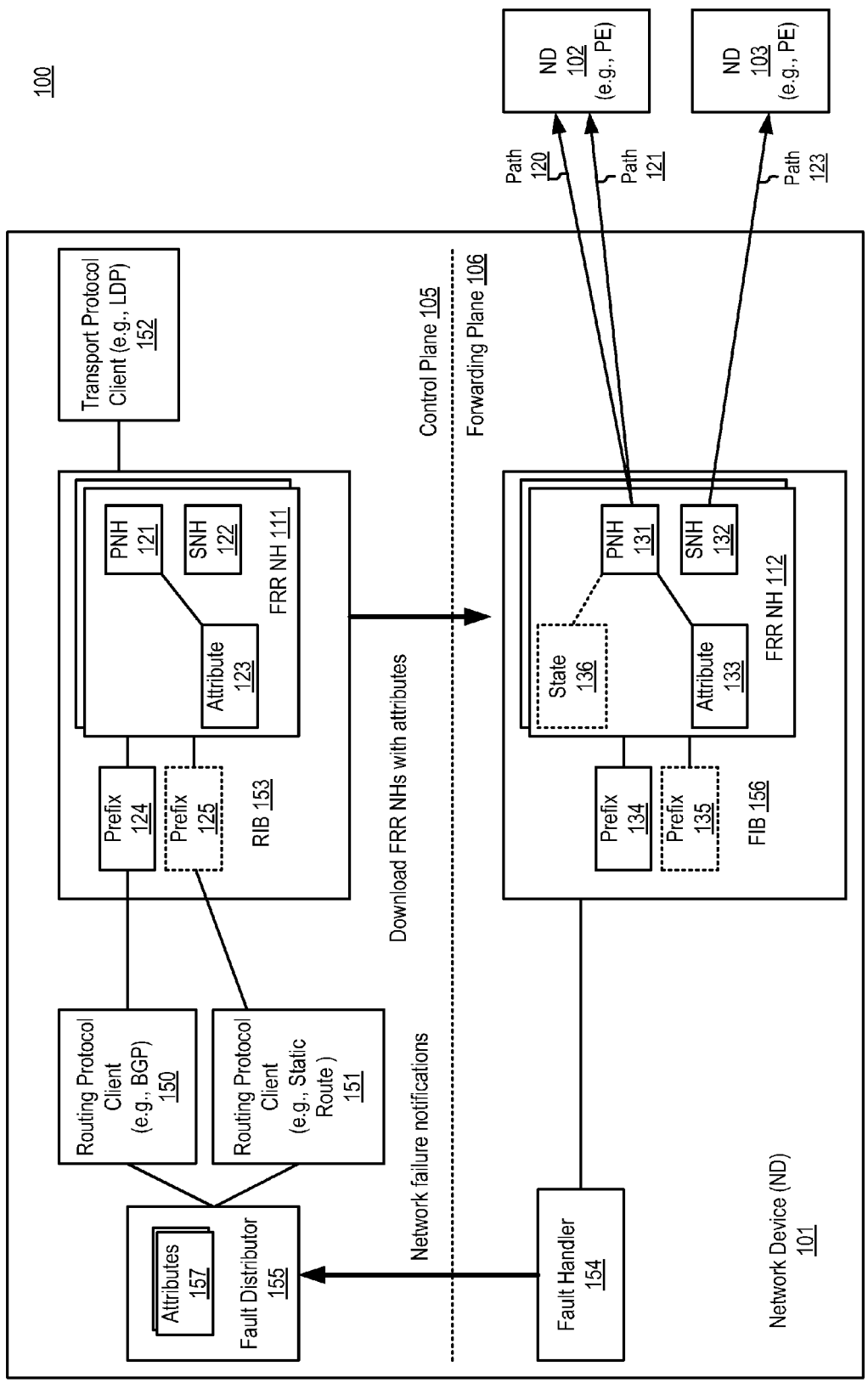
FIG. 1 is a block diagram illustrating a network device for maintaining synchronization between a control plane and a forwarding plane according to one embodiment.

The following description describes methods and apparatus for synchronizing control planes and forwarding planes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating network 100 according to one embodiment. Network 100 includes, but is not limited to, network device 101 (e.g., a FRR network device) communicatively coupled to network device 102 via its primary path(s). Network device 101 is further communicatively coupled to network device 103 via its secondary (i.e., backup) path. For example, network devices 102-103 can be provider edge (PE) routers that provide Virtual Private Network (VPN) service.

According to one embodiment, network device 101 includes control plane 105 and forwarding plane 106. It should be noted, however, that control plane 105 and forwarding plane 106 can be implemented as part of multiple network devices (commonly referred to as the Software Defined Network (SDN) architecture, which is described in further details below). In one embodiment, control plane 105 includes, but is not limited to, fault distributor 155, routing protocol clients 150-151 (herein referred to simply as routing clients 150-151), RIB 153, and transport protocol client 152 (herein referred to simply as transport client 152), all of which can be implemented in software, firmware, hardware, or any combination thereof.

Each of routing clients 150-151 can be implemented as a Border Gateway Protocol (BGP) client, static route client, etc. Routing clients 150-151 are responsible for determining reachability and adding/removing/updating routes to RIB 153. A "route", as used herein, refers to an association of an IP prefix and a next hop chain, which is used for forwarding IP packets. It should be noted that control plane 105 can include more or less routing clients than as illustrated in FIG. 1.

RIB 153 includes a plurality of FRR NHs, each of which can be implemented as one or more data structures stored in one or more storage devices accessible by network device 101. In this example, RIB 153 includes FRR NH 111, which comprises primary next hop (PNH) 121 and secondary next hop (SNH) 122. PNH 121 includes forwarding information for causing IP traffic to be forwarded via a set of one or more primary paths, and SNH 122 includes forwarding information for causing IP traffic to be forwarded via a set of one or more backup paths (when the primary paths are down). FRR NH 111 further includes attribute 123, which is described in further details below. In one embodiment, each FRR NH is associated with one IP prefix. In another embodiment, multiple IP prefixes can share one FRR NH. In this example, both prefixes 124-125 share FRR NH 111. For example, the route comprising of prefix 124 and FRR NH 111 may be added by client 150, and the route comprising of prefix 125 and FRR NH 111 may be added by client 151.

When a new route is added for the first time, RIB 153 causes the route to be downloaded to forwarding plane 106. Subsequently, when new routes are added which share the same FRR NH, RIB 153 does not re-download the FRR NH. Instead, RIB 153 only downloads the new prefix that points/references the existing FRR NH.

In one embodiment, forwarding plane 106 includes, but is not limited to, fault handler 154 and Forwarding Information Base (FIB) 156, both of which can be implemented in software, firmware, hardware, or any combination thereof. FIB 156 includes a plurality of FRR NHs, each of which can be implemented as one or more data structures stored in one or more storage devices accessible by network device 101. In this example, FIB 156 comprises FRR NH 112, which comprises PNH 131 and SNH 132. PNH 131 includes forwarding information for causing IP traffic to be forwarded via a set of one or more primary paths, and SNH 132 includes forwarding information for causing IP traffic to be forwarded via a set of one or more backup paths (when the primary paths are down). FRR NH 112 further includes attribute 133 and optional state 136 which are described in further details below.

FIB 156 generates and updates its FRR NHs based on FRR NH information downloaded from RIB 153. By way of example, after adding the route comprising of prefix 124 and FRR NH 111, RIB 153 downloads it to FIB 156, which generates corresponding prefix 134 and FRR NH 112. For example, FIB 156 generates prefix 134, PNH 131, SNH 132, and attribute 133 using information of prefix 124, PNH 121, SNH 122, and attribute 123, respectively, that are downloaded from RIB 153 to FIB 156. Subsequently, when the new route comprising of prefix 125 and FRR NH 111 is added, RIB 153 downloads to FIB 156 prefix 125 and a pointer/reference to FRR NH 111, causing FIB 156 to add prefix 135 that points to FRR NH 112.

In this example, PNH 121 and PNH 131 contain forwarding information that causes IP traffic to be forwarded to network device 102 via paths 120-121. For example, paths 120-121 can be Equal Cost Multi Path (ECMP) paths. SNH 122 and SNH 132 contain forwarding information that causes IP traffic to be forwarded to network device 103 via path 123. In the absence of a failure on the primary path, FIB 156 causes FRR NH 112 to use PNH 131 for forwarding IP traffic associated with prefixes 134-135 (i.e., to use forwarding information included in PNH 131 for forwarding IP traffic associated with prefixes 134-135 towards network device 102 via primary paths 120-121). When there is a failure (e.g., network device 102 is down), FIB 156 causes FRR NH 112 to switch to SNH 132 (i.e., to start using the forwarding information included in SNH 132 for forwarding IP traffic associated with prefixes 134-135 towards network device 103 via backup path 123). It should be noted that when a switch over occurs, FIB 156 and RIB 153 are to remain in sync, although RIB 153 may take longer to reconverge to the same state as FIB 156. Due to the limitations of conventional implementations of control planes and forwarding planes, however, there are instances where the control plane and the forwarding plane may be out of sync. For example, the forwarding plane may be in the backup state while the control plane is in the primary state, or vice versa. Embodiments of the present invention overcome such limitations by providing attributes that are associated with each PNH.

According to one embodiment, fault handler 154 is configured to detect network failures. For example, fault handler 154 can be implemented using a multi-hop Bidirectional Forwarding Detection (BFD) protocol which uses a hello mechanism for detecting failures. Under the multi-hop BFD protocol, hello messages are sent at a predetermined time interval. Failure to receive a hello message within the predetermined time interval indicates that the remote network device is down.

In one embodiment, in response to detecting a remote network device is down, fault handler 154 causes FIB 156 to switch a corresponding FRR NH to use its backup path. For example, in response to detecting network device 102 is down, fault handler 154 causes FIB 156 to switch FRR NH 112 from using PNH 131 to using SNH 132. Fault handler 154 is further configured to send a notification to control plane 105 (e.g., fault distributor 155 of control plane 105).

According to one embodiment, fault distributor 155 maintains attributes 157, each of which corresponds to a PNH in RIB 153. For example, one attribute of attributes 157 corresponds to attribute 123. The attributes can be implemented using various mechanisms, including, but is not limited to, timestamps, sequence numbers, pseudo random numbers (PRNs), etc. Throughout the description, attributes are described as being maintained (e.g., generated and updated) by fault distributor 155. It should be noted that the attributes can be maintained by other components in control plane 105 (e.g., routing clients 150-151). Alternatively, the attributes may be maintained by forwarding plane 106 (e.g., fault handler 154).

In one embodiment, responsive to receiving a failure notification from fault handler 154, fault distributor 155 is to update the attribute that is associated with the PNH that contains forwarding information that causes IP traffic to be forwarded to the failed network device. Continuing on with the above example, fault distributor 155 is to update the attribute of attributes 157 that is associated with PNH 121.

As used herein, "updating" the attribute refers to generating a new/different attribute (e.g., by incrementing the sequence number, using the current timestamp, generating a new PRN, etc.).

In one embodiment, fault distributor 155 is to notify routing clients 150-151 of the failure notification and the new/different attribute. Routing clients 150-150 are to determine whether the notification is a true or a false alarm. For example, routing clients 150-151 may each start a timer with a preloaded value, and if the timer expires without routing clients 150-151 receiving another notification indicating the failed network device is up again, routing clients 150-151 determine that the notification is not a false alarm. Alternatively, if a notification (indicating the failed network device is up) is received before the timer expires, routing clients 150-151 determine that the original notification was a false alarm.

According to one embodiment, in response to determining the failure notification is not a false alarm, routing clients 150-151 do not re-download the paths to RIB 153, thus preventing the new attribute from propagating to RIB 153. Referring still to the above example, if routing clients 150-151 determine that the notification indicating network device 102 is down was not a false alarm, routing clients 150-151 would not re-download to RIB 153 the routing information associated with FRR NH 111, thus, preventing attribute 123 from being updated with the new attribute generated by fault distributor 155. As will be described in further details below, by maintaining attribute 123 at its current value, subsequent downloads of FRR NH 111 will not cause FRR NH 112 in forwarding plane 106 to erroneously switch back to its primary path (i.e., PNH 131).

Alternatively, if routing clients 150-151 determine that the notification indicating network device 102 is down was a false alarm, routing clients 150-151 re-download the paths to RIB 153, causing the new attribute from fault distributor 155 to propagate to RIB 153. Referring still to the above example, if routing clients 150-151 determine that the notification indicating network device 102 is down was a false alarm, routing clients 150-151 would re-download to RIB 153 the routing information associated with FRR NH 111, thus, causing attribute 123 to be updated with the new attribute generated by fault distributor 155. As will be described in further details below, by updating attribute 123 with a different value, subsequent downloads of FRR NH 111 will cause FRR NH 112 in forwarding plane 106 to switch back to its primary path (i.e., PNH 131), instead of being erroneously stuck in the backup path (i.e., SNH 132).

Conventionally, when the RIB re-downloads a FRR NH to the FIB, a conventional FIB updates its corresponding local FRR NH with the newly downloaded FRR NH, and indiscriminately reverts back to using the primary path. In cases where the control plane discovers the failed network device in a staggered manner and re-downloads the FRR NH, the forwarding plane may be caused to erroneously switch back to its primary path, even though the remote network device is down.

Embodiments of the present invention overcome such limitations by associating each PNH with an attribute, which is downloaded to FIB 156 as part of each FRR NH download. In one embodiment, when FIB 156 receives a download of an existing FRR NH, FIB 156 causes the contents of its local FRR NH to be updated with the new contents in the download. Unlike a conventional FIB, however, FIB 156 does not indiscriminately revert its FRR NH back to the primary path. In contrast, FIB 156 causes the FRR NH to revert back to the primary path only if the attribute included in the download is different from the corresponding local attribute. In this way, when FIB 156 receives a re-download of an existing FRR NH, FIB 156 is able to determine whether RIB 153 is aware of the failure notification, and truly intends for FIB 156 to switch the FRR NH back to using the primary path.

By way of example, when RIB 153 re-downloads FRR NH 111, FIB 156 updates the contents of PNH 131 and SNH 132 with the contents of PNH 121 and SNH 122, respectively, included in the download. FIB 156 determines whether attribute 123 included as part of the re-download matches attribute 133. If so, FIB 156 does not cause FRR NH 112 to revert back to PNH 131. If, however, FIB 156 determines that attribute 123 included as part of the re-download does not match attribute 133, FIB 156 causes FRR NH 112 to revert back to PNH 131.

In one embodiment, FIB 156 maintains state information to keep track of the state (e.g., up or down) of remote network devices that are part of the primary paths. For example, the state information may be maintained based on the failures detected by fault handler 154. In the illustrated example, state 136 contains information indicating whether remote network device 102 is up or down. In one such embodiment, in response receiving a re-download of an existing FRR NH, FIB 156 determines whether the state information indicates the remote network device that is part of the primary path of the FRR NH is up or down. If FIB 156 determines that the remote network device is down, FIB 156 does not revert back to the primary path, regardless of whether the attributes match. If, however, FIB 156 determines that the remote network device is up, FIB 156 determines whether to cause the FRR NH to revert back to its primary path based on whether the attributes match, as described above.

Referring now back to control plane 105. There are instances where one or more routing clients may not be able to keep up with the failure notifications. For example, assume that routing client 150 has detected 5 failure notifications associated with FRR NH 111, and caused RIB 153 to download FRR NH 111 to FIB 156 5 times, each time causing attribute 123 to be updated with a new value. Assume further that routing client 151 is slower at processing the failure notifications, and that it is currently processing the first failure notification. In such an example, routing client 151 would be presenting to RIB 153 an attribute that is older than attribute 123. In one embodiment, in response to determining the attribute presented by a routing client is older than the attribute currently stored in RIB 153, RIB 153 does not update the FRR NH nor does it re-download the FRR NH down to FIB 156. In this way, RIB 153 is able to prevent stale information from being populated in the FRR NHs. Embodiments of the present invention shall now be described in greater details through the discussion of various figures below.

Figure 2:
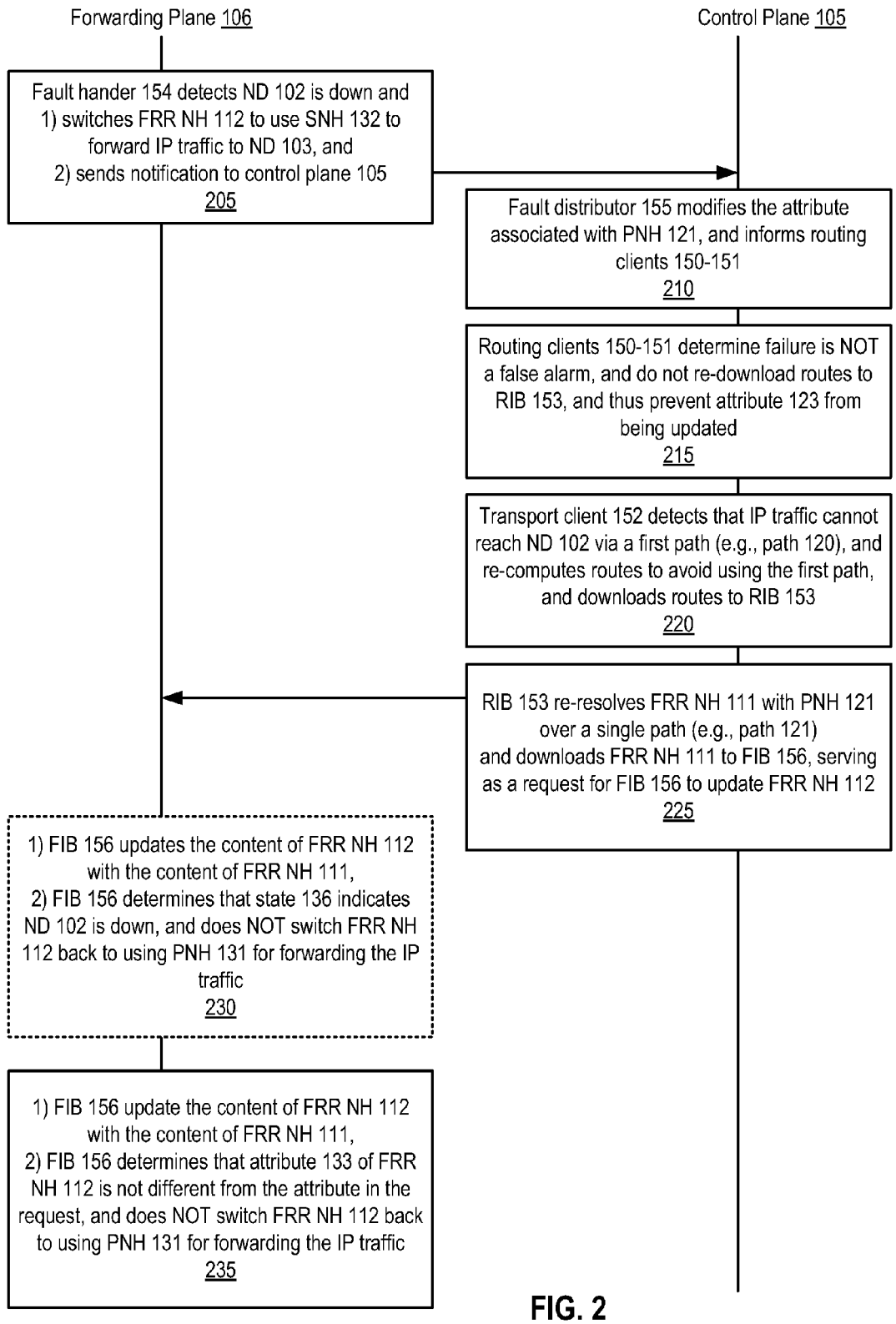
FIG. 2 is a transaction diagram illustrating the transactions for maintaining FRR NHs according to one embodiment.

FIG. 2 is a transaction diagram illustrating the transactions for maintaining FRR NHs according to one embodiment. The transactions of FIG. 2 assume the network topology as shown in FIG. 1, and further assume that RIB 153 and FIB 156 have generated FRR NHs 111-112, respectively. Referring now to FIG. 2, at block 205 fault handler 154 detects network device 102 is down, for example, by using a protocol similar to the multi-hop BFD protocol. As part of block 205, fault handler 154, either directly or indirectly through FIB 156, causes FRR NH 112 to switch to its backup path (i.e., to use SNH 132 for forwarding the IP traffic towards network device 103 via backup path 123). Fault handler 154 further sends a notification to control plane 105 (e.g., to fault distributor 155).

At block 210, in response to receiving the notification, fault distributor 155 modifies the attribute of attributes 157 that is associated with PNH 121, and informs routing clients 150-151 of the notification and updated attribute. At block 215, routing clients 150-151 determine that the failure notification is not a false alarm (i.e., network device 102 is truly down), and do not re-download their routes to RIB 153, thus preventing attribute 123 associated with PNH 121 from being updated with the new attribute generated by fault distributor 155.

At block 220, transport client 152 discovers the failure of network device 102 in a staggered manner. Discovering the failure in a "staggered" manner refers to transport client 152 first determining that IP traffic cannot reach network device 102 via a first path (e.g., path 120), and then discovering that IP traffic also cannot reach network device 102 via a second path (e.g., path 121). In response to determining that IP traffic cannot reach network device 102 via a first path, transport client 152 re-computes its routes to avoid using the first path, and downloads the recomputed paths to RIB 153. For example, transport client 152 computes a new route to network device 102 such that path 120 is not used, and downloads the new route to RIB 153.

At block 225, in response to the downloaded routes from transport client 152, RIB 153 recursively re-resolves all FRR NHs, and updates PNH 121 with the new forwarding information that excludes the first path. For example, RIB 153 re-resolves FRR NH 111 with PNH 121 over a single path (e.g., path 121). As part of block 225, in response to the update to PNH 121, RIB 153 re-downloads FRR NH 111 to FIB 156, wherein the download includes contents of PNH 121, SNH 122, and unmodified attribute 123. The re-download of FRR NH 111 serves as a request for FIB 156 to update corresponding FRR NH 112.

Conventionally, when a forwarding plane receives a re-download of a FRR NH, the forwarding plane updates its FRR NH with the contents received as part of the download. The conventional forwarding plane further indiscriminately reverts the FRR NH back to its primary path. This is problematic because the remote network device associated with the primary path may be down (as illustrated in this example), and thus, resulting in loss of traffic. Embodiments of the present invention overcome such limitations by including in each download an attribute of the FRR NH, to be used by the forwarding plane in determining whether or not to revert back to its primary path.

At optional block 230, FIB 156 updates the contents of FRR NH 112 with the contents of FRR NH 111 included as part of the download. Contrary to a conventional FIB, however, FIB 156 does not indiscriminately cause FRR NH 112 to revert back to its primary path. Instead, FIB 156 determines that state 136 indicates network device 102 is down, and does not cause FRR NH 112 to switch back to PNH 131 for forwarding the IP traffic. It should be noted that by maintaining state information such as state 136, forwarding plane 106 is able to handle race conditions that can occur during a small time window where fault handler 154 detects another failure while control plane 105 is still processing the previous failure. For example, fault handler 154 may notify control plane 105 of a first failure which turns out to be a false alarm. While control plane 105 is processing the first failure, fault handler 154 may detect a second failure which turns out to be true. In this scenario, after control plane 105 completes processing the first failure, it will download a new FRR NH with a different attribute, causing forwarding plane 106 to switch back to its primary path, even though there is a true failure. In an embodiment where state 136 is not implemented, FIB 156 proceeds directly to block 235.

At block 235, FIB 156 updates the contents of FRR NH 112 with the contents of FRR NH 111 included as part of the download. Contrary to a conventional FIB, however, FIB 156 does not indiscriminately cause FRR NH 112 to revert back to its primary path. Instead, FIB 156 determines that attribute 123 included in the download matches attribute 133, and does not cause FRR NH 112 to switch back to PNH 131 for forwarding the IP traffic. Thus, unlike a conventional forwarding plane, forwarding plane 106 is able to remain on its backup path, and avoid erroneously reverting back to its primary path.

Figure 3:
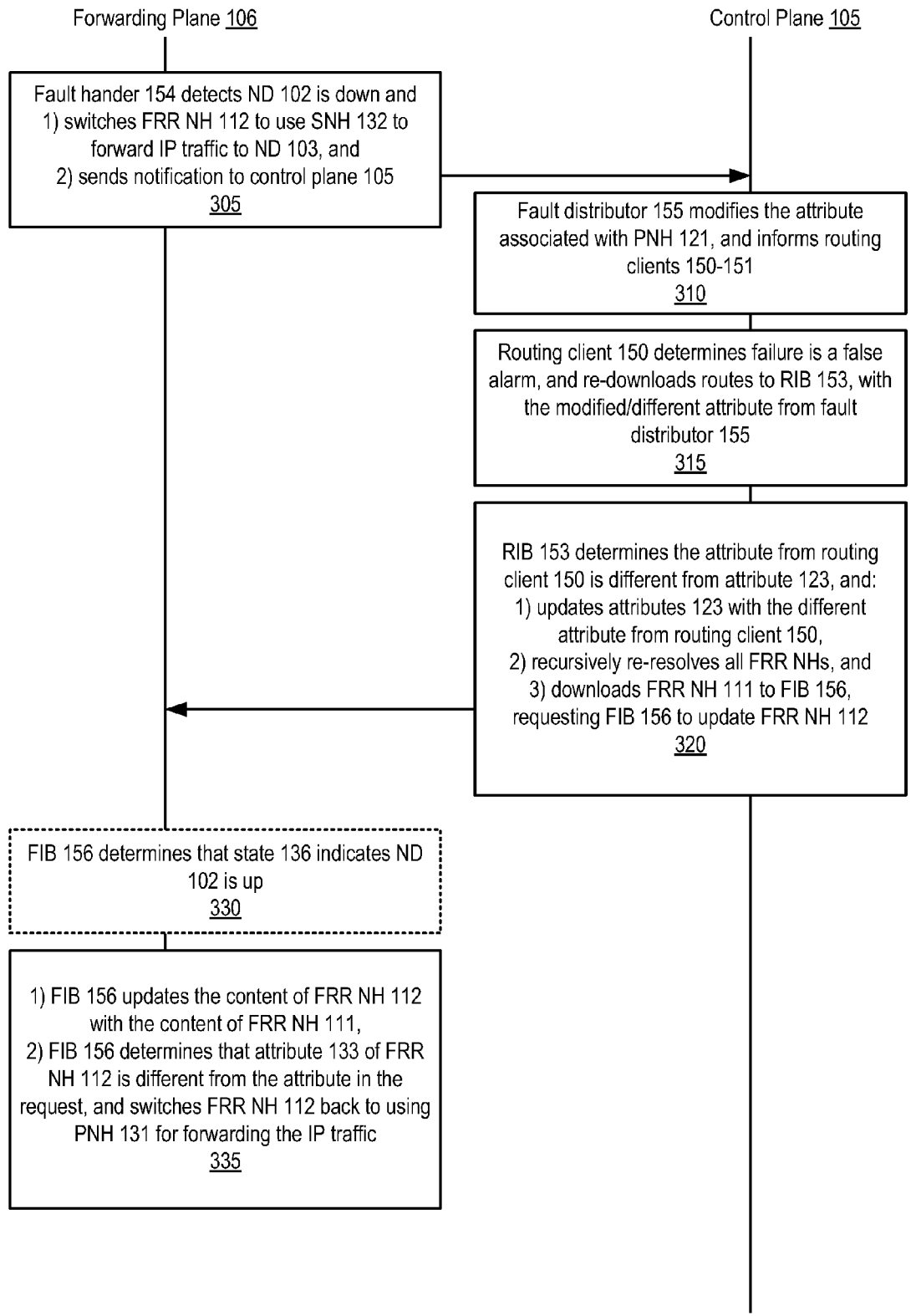
FIG. 3 is a transaction diagram illustrating the transactions for maintaining FRR NHs according to one embodiment.

FIG. 3 is a transaction diagram illustrating the transactions for maintaining FRR NHs according to one embodiment. The transactions of FIG. 3 assume the network topology as shown in FIG. 1, and further assume that RIB 153 and FIB 156 have generated FRR NHs 111-112, respectively. Referring now to FIG. 3, at block 305 fault handler 154 detects network device 102 is down, for example, by using a protocol similar to the multi-hop BFD protocol. As part of block 305, fault handler 154, either directly or indirectly through FIB 156, causes FRR NH 112 to switch to its backup path (i.e., to use SNH 132 for forwarding the IP traffic towards network device 103 via backup path 123). Fault handler 154 further sends a notification to control plane 105 (e.g., to fault distributor 155).

At block 310, in response to receiving the notification, fault distributor 155 modifies the attribute of attributes 157 that is associated with PNH 121, and informs routing clients 150-151 of the notification and updated attribute. At block 315, a routing client (e.g., routing client 150) determines that the failure notification is a false alarm (i.e., network device 102 is not down).

Conventionally, when the control plane determines that a failure notification is a false alarm, the control plane would not update its FRR NHs because as far as the control plane is concerned, the primary path is still operational. Since the FRR NHs are not updated, the control plane has no reason to re-download them to the forwarding plane. Without a re-download, the forwarding plane is stuck in the backup path, while the control plane erroneously believes it is in the primary path. As a result, the control plane and the forwarding plane are out of sync. Embodiments of the present invention overcome such limitations by causing control plane 105 to re-download the FRR NH associated with the network device that was falsely determined to be down.

According to one embodiment, as part of block 315, in response to determining that the failure notification is a false alarm, routing client 150 re-downloads its routes to RIB 153 with the new attribute generated by fault distributor 155. At block 320, in response to the downloaded routes from routing client 150, RIB 153 determines that the new attribute from routing client 150 is different from attribute 123, and recursively re-resolves all FRR NHs, including updating attribute 123 with the new attribute from routing client 150. As part of block 320, in response to the update to FRR NH 111, RIB 153 re-downloads FRR NH 111 to FIB 156, wherein the download includes the contents of PNH 121, SNH 122, and modified attribute 123.

At optional block 330, FIB 156 determines that state 136 indicates network device 102 is up, and proceeds to block 335. In an embodiment state 136 is not implemented, FIB 156 proceeds directly to block 335.

At block 335, FIB 156 updates the contents of FRR NH 112 with the contents of FRR NH 111 included as part of the download. Contrary to a conventional FIB, however, FIB 156 does not indiscriminately cause FRR NH 112 to revert back to its primary path. Instead, FIB 156 determines that attribute 123 included in the download does not match local attribute 133, and causes FRR NH 112 to switch back to PNH 131 for forwarding the IP traffic. Thus, unlike a conventional forwarding plane, forwarding plane 106 is able to revert back to its primary path, and avoid erroneously being stuck in the backup path due to a false alarm.

It should be noted that multiple clients can re-download their routes to RIB 153 as part of block 315. In such cases, RIB 150 would only perform the operations of block 320 (i.e., update FRR NH 111 and re-download) once because only the routes downloaded by the routing client with the newest attribute would be processed. By way of example, suppose routing client 150 has downloaded its routes to RIB 153, and caused RIB 153 to download the updates to FIB 156. Supposed that routing client 151 then downloads its routes to RIB 153. RIB 153 would not update the routes nor re-download to FIB 156 because the attribute presented by routing client 151 is not new/different from the current attribute 123. Thus, contrary to a conventional RIB, RIB 153 only re-downloads the FRR NH once when multiple clients re-download the same FRR NH to RIB 153.

Figure 4:
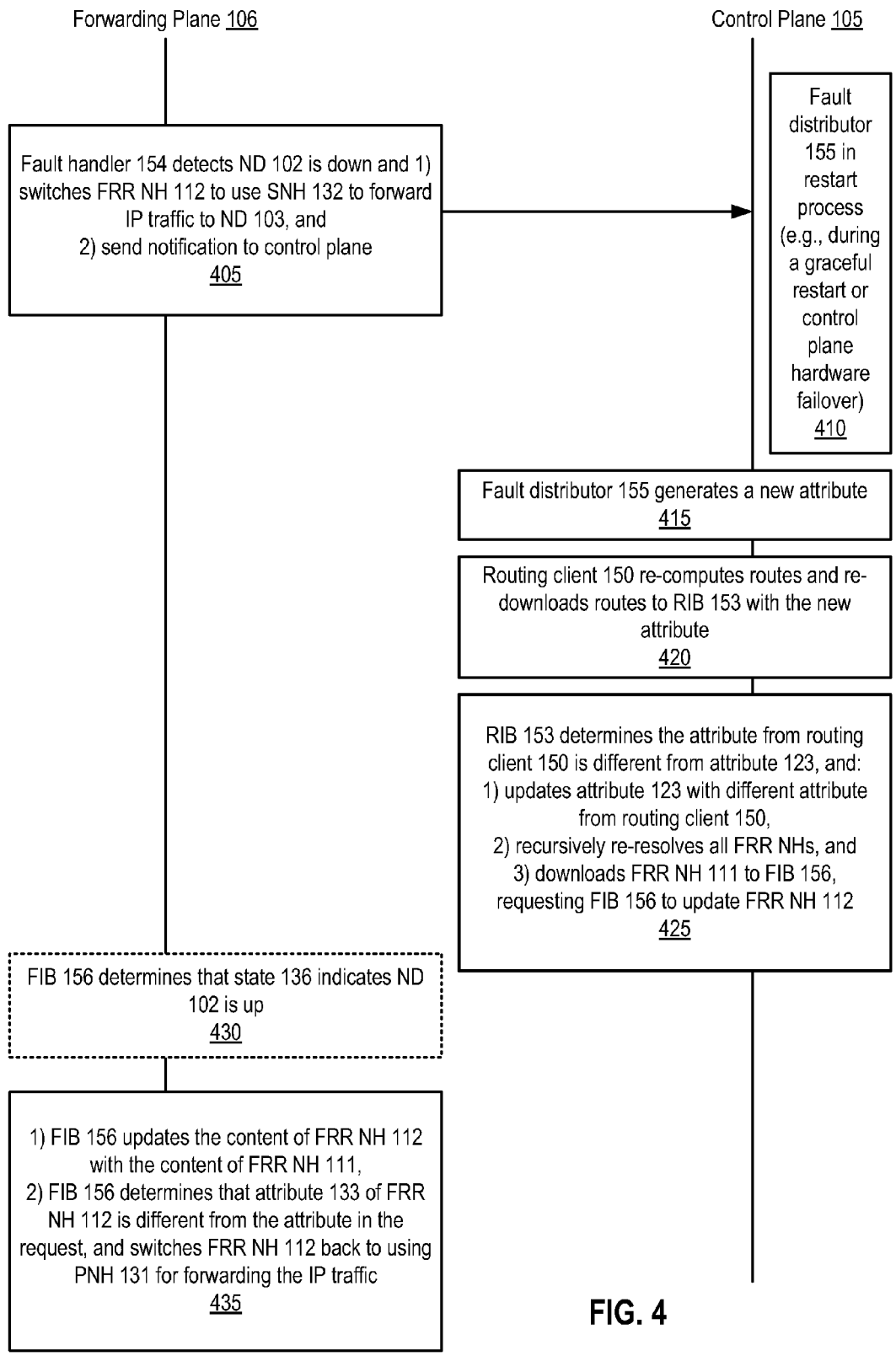
FIG. 4 is a transaction diagram illustrating the transactions for maintaining FRR NHs according to one embodiment.

FIG. 4 is a transaction diagram illustrating the transactions for maintaining FRR NHs according to one embodiment. The transactions of FIG. 4 assume the network topology as shown in FIG. 1, and further assume that RIB 153 and FIB 156 have generated FRR NHs 111-112, respectively. Referring now to FIG. 4, at block 405 fault handler 154 detects network device 102 is down, for example, by using a protocol such as the multi-hop BFD protocol. As part of block 405, fault handler 154, either directly or indirectly through FIB 156, causes FRR NH 112 to switch to its backup path (i.e., to use SNH 132 for forwarding the IP traffic towards network device 103 via backup path 123). Fault handler 154 further sends a notification to control plane 105 (e.g., to fault distributor 155).

At block 410, fault distributor 155 is in a restart process and misses the notification from fault handler 154. Fault distributor 155 may be in a restart process for various reasons. For example, control plane 105 may be performing a graceful restart, or there may have been a hardware failover, etc.

Conventionally, when there is a graceful restart or a hardware failover, a control plane does not re-download the FRR NHs because it is not aware of any changes to the FRR NHs. In the case where the missed notification is a false alarm and the forwarding plane has switched to the backup path, the forwarding plane may remain stuck in the backup path while the control plane believes it is in the primary path. In other words, a missed notification can cause the control plane and the forwarding plane to be out of sync. Embodiments of the present invention overcome such limitations by causing FRR NHs to be re-downloaded after a restart process.

At block 415, fault distributor 155, in response to the restart process, generates a new attribute for each next hop, and sends them to routing clients 150-151. At block 420, in response to the new attributes, routing clients (e.g., routing client 150) re-computes its routes and re-downloads them to RIB 153 with the new attributes.

At block 425, in response to the downloaded routes from routing client 150, RIB 153 determines that the new attribute from routing client 150 is different from attribute 123, and recursively re-resolves all FRR NHs, including updating attribute 123 with the new attribute from routing client 150.

As part of block 425, in response to the update to FRR NH 111, RIB 153 re-downloads FRR NH 111 to FIB 156, wherein the download includes the contents of PNH 121, SNH 122, and modified attribute 123.

At optional block 430, FIB 156 determines that state 136 indicates network device 102 is up, and proceeds to block 435. In an embodiment state 136 is not implemented, FIB 156 proceeds directly to block 435.

At block 435, FIB 156 updates the contents of FRR NH 112 with the contents of FRR NH 111 included as part of the download. FIB 156 determines that attribute 123 included in the download does not match local attribute 133, and causes FRR NH 112 to switch back to PNH 131 for forwarding the IP traffic. Thus, unlike a conventional forwarding plane, forwarding plane 106 is able to revert back to its primary path, and avoid erroneously being stuck in the backup path due to a false alarm.

FIG. 5 is a flow diagram illustrating a method for maintaining FRR NHs according to one embodiment. For example, method 500 can be performed by control plane 105, which can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 5, at block 505, a control plane generates a first FRR NH (e.g., FRR NH 111) comprising of a PNH (e.g., PNH 121), a SNH (e.g., SNH 122), and an attribute (e.g., attribute 123), wherein the PNH includes forwarding information that causes Internet Protocol (IP) traffic to be forwarded towards a second network device (e.g., network device 102), and wherein the SNH includes forwarding information that causes the IP traffic to be forwarded towards a third network (e.g., network device 103).

At block 510, the control plane sends a request to a forwarding plane to generate a second FRR NH (e.g., FRR NH 112) that corresponds to the first FRR NH, wherein the PNH (e.g., PNH 131), SNH (e.g., SNH 132), and attribute (e.g., attribute 133) of the second FRR NH are generated based on the PNH, SNH, and attribute, respectively, of the first FRR NH included in the request.

At block 515, the control plane (e.g., fault distributor 155) receives a notification from the forwarding plane (e.g., fault handler 154) indicating the second network device is not operational. At block 520, the control plane (e.g., routing clients 150-151) determines whether the notification is a false alarm. At block 525, in response to determining the notification is not a false alarm ("No" branch of block 520), the control plane does not modify the attribute of the first FRR NH. For example, in response to determining the failure notification is not a false alarm, routing clients 150-151 do not re-download their routes to RIB 153, thus preventing RIB 153 from updating attribute 123.

At block 530, the control plane sends a request to the forwarding plane to update the second FRR NH that corresponds to the first FRR NH, wherein the PNH, SNH, and attribute of the second FRR NH are updated based on the PNH, SNH, and un-modified attribute, respectively, of the first FRR NH included in the request, wherein the un-modified attribute causes the forwarding plane not to revert back to using the PNH of the second FRR NH. For example, transport client 152 determines the failure of network device 102 in a staggered manner, by first determining that IP traffic cannot reach network device 102 via path 120. In response to such a determination, transport client 152 re-resolves its routes to exclude path 120 from being used for forwarding traffic to network device 102. Transport client 152 then downloads the new routes to RIB 153, which re-resolves FRR NH 111 with PNH 121 over the single path 121. In response to the update to the contents of PNH 121, RIB 153 re-downloads FRR NH 111 to forwarding plane 106, serving as a request for forwarding plane 156 to update FRR NH 112. Forwarding plane 106, in response to the download, updates the contents of FRR NH 112 using the contents of FRR NH 111 included in the download. Forwarding plane 106, however, does not cause FRR NH 112 to revert back to PNH 131 because unmodified attribute 123 included in the download matches attribute 133 stored in forwarding plane 106.

Returning now back to block 520. In response to determining the failure notification is a false alarm, the control plane proceeds to block 535 ("Yes" branch of block 520). At block 535, the control plane modifies the attribute of the first FRR NH. For example, in response determining the failure notification is a false alarm, routing client 150 downloads its routes with a new attribute to RIB 153. In response to the download from routing client 150, RIB 153 re-resolves its FRR NH 111 and updates attribute 123 with the new attribute from routing client 150.

At block 540, the control plane sends a request to the forwarding plane to update the second FRR NH that corresponds to the first FRR NH, wherein the PNH, SNH, and attribute of the second FRR NH are updated based on the PNH, SNH, and modified attribute, respectively, of the first FRR NH included in the request, wherein the modified attribute causes the forwarding plane to revert back to using the PNH of the second FRR NH. For example, in response to the update to the contents of FRR NH 111 caused by the download from routing client 150, RIB 153 re-downloads FRR NH 111 to forwarding plane 106, serving as a request for forwarding plane 156 to update FRR NH 112. Forwarding plane 106, in response to the download, updates the contents of FRR NH 112 using the contents of FRR NH 111 included in the download. Further, forwarding plane 106 determines that modified attribute 123 included in the download does not match attribute 133 stored in forwarding plane 106, and in response to such determination, causes FRR NH 112 to revert back to PNH 131.

FIG. 6 is a flow diagram illustrating a method for maintaining FRR NHs according to one embodiment. For example, method 600 can be performed by forwarding plane 106, which can be implemented in software, firmware, hardware, or any combination thereof. Referring now to FIG. 6, at block 605, a forwarding plane generates a FRR NH (e.g., FRR NH 112) comprising of a PNH (e.g., PNH 131), a SNH (e.g., SNH 132), and an attribute (e.g., attribute 133), wherein the PNH includes forwarding information that causes Internet Protocol (IP) traffic to be forwarded towards a second network device (e.g., network device 102), and wherein the SNH includes forwarding information that causes the IP traffic to be forwarded towards a third network device (e.g., network device 103).

At block 610, the forwarding plane, in response to detecting the second network device is not operational: 1) switches the FRR NH to use the SNH to forward IP traffic towards the third network device, and 2) sends a notification to a control plane indicating the second network device is not operational. For example, in response to detecting network device 102 is not operational, fault handler 154: 1) switches FRR NH 112 to use SNH 132 to forward IP traffic towards network device 103, and 2) sends a notification to fault distributor 155 indicating network device 102 is not operational.

At optional block 615, the forwarding plane maintains state information (e.g., state 136) of whether the second network device is operational. At block 620, the forwarding plane receives a request from the control plane to update the FRR NH entry, wherein the request includes a PNH, a SNH, and an attribute. For example, FIB 156 receives from RIB 153 a download of FRR NH 111, which serves as a request to update FRR NH 111. The download includes, for example, PNH 121, SNH 122, and attribute 123.

At optional block 625, the forwarding plane determines whether the state information indicates the second network device is down. For example, FIB 156 determines whether state 136 indicates network device 102 is down. It should be noted that in an embodiment where the forwarding plane does not maintain state information of remote devices, the forwarding plane proceeds from block 620 directly to block 630. At block 630, in response to determining the state information does not indicate the second network device is down ("No" branch of block 625), the forwarding plane determines whether the attribute included in the request (i.e., the download) matches the attribute of the FRR NH. For example, in response to determining state 136 does not indicate that network device 102 is down, FIB 156 determines whether attribute 123 included in the request/download matches attribute 133 of FRR NH 112.

At block 635, in response to determining the attribute in the request/download matches the attribute of the FRR NH ("Yes" branch of block 630), the forwarding plane updates the contents of the FRR NH with the PNH and SNH included in the request, without switching the FRR NH back to using the PNH for forwarding the IP traffic towards the second network device. For example, in response to determining attribute 123 included in the request/download matches attribute 133 of FRR NH 112, FIB 156 updates the contents of FRR NH 112 with PNH 121 and SNH 122 included in the request, without switching FRR NH 112 back to using PNH 131 for forwarding the IP traffic towards network device 102.

Returning now back to optional block 625. In response to determining the state information indicates the second network device is down ("Yes" branch of block 625), the forwarding plane proceeds to block 635 and performs the operations as described above.

Returning now back to block 630. In response to determining the attribute included in the request (i.e., the download) does not match the attribute of the FRR NH ("No" branch of block 630), the forwarding plane proceeds to block 640. At block 640, the forwarding plane updates the contents of the FRR NH with the PNH and SNH included in the request, and also switches the FRR NH back to using the PNH for forwarding the IP traffic towards the second network device. For example, in response to determining attribute 123 included in the request/download does not match attribute 133 of FRR NH 112, FIB 156 updates the contents of FRR NH 112 with PNH 121 and SNH 122 included in the request, and further switches FRR NH 112 back to using PNH 131 for forwarding the IP traffic towards network device 102.

FIG. 7 is a flow diagram illustrating a method for maintaining FRR NHs according to one embodiment. For example, method 700 can be performed by control plane 105, which can be implemented in software, firmware, hardware, or any combination thereof. Referring now to FIG. 7, at block 705, a control plane generates a first FRR NH (e.g., FRR NH 111) comprising of a first PNH (e.g., PNH 121), a first SNH (e.g., SNH 122), and a first attribute (e.g., attribute 123), wherein the first PNH includes forwarding information that causes IP traffic to be forwarded towards a second network device (e.g., network device 102) via a plurality of paths (e.g., paths 120-121), and wherein the first SNH includes forwarding information that causes the IP traffic to be forwarded towards a third network device (e.g., network device 103).

At block 710, the control plane sends a first request to a forwarding plane to generate a second FRR NH (e.g., FRR NH 112) comprising of a second PNH (e.g., PNH 131), a second SNH (e.g., SNH 132), and a second attribute (e.g., attribute 133), wherein the second PNH, the second SNH, and the second attribute are to be generated based on the first PNH, the first SNH, and the first attribute, respectively, included in the first request. For example, control plane 105 requests forwarding plane 106 to generate FRR NH 112 by downloading FRR NH 111 to forwarding plane 106.

At block 715, the control plane updates the contents of the first FRR NH (e.g., as part of block 225, 320, or 425). At block 720, the control plane sends a second request to the forwarding plane to update the second FRR NH, wherein the second PNH and the second SNH are to be updated based on the first PNH and the first SNH, respectively, included in the second request, wherein the second request causes the forwarding plane to determine whether to revert back to using the second PNH for forwarding the IP traffic towards the second network device based on whether the first attribute included in the second request is different from the second attribute of the second FRR NH. For example, control plane 105 downloads FRR NH 111 to forwarding plane 106 as part of block 225, 320, or 425.

FIG. 8 is a flow diagram illustrating a method for maintaining FRR NHs according to one embodiment. For example, method 800 can be performed by forwarding plane 106, which can be implemented in software, firmware, hardware, or any combination thereof. Referring now to FIG. 8, at block 805, a forwarding plane generates a FRR NH (e.g., FRR NH 112) comprising of a PNH (e.g., PNH 131), a SNH (e.g., SNH 132), and an attribute (e.g., attribute 133), wherein the PNH includes forwarding information that causes IP traffic to be forwarded towards a second network device (e.g., network device 102), wherein the SNH includes forwarding information that causes the IP traffic to be forwarded towards a third network device (e.g., network device 103).

At block 810, the forwarding plane detects the second network device is not operational (e.g., as part of block 205, 305, or 405). At block 815, the forwarding plane, in response to detecting the second network device is not operational, causes the FRR NH to switch from using the PNH for forwarding the IP traffic towards the second network device to using the SNH for forwarding the IP traffic towards the third network device. (e.g., as part of block 205, 305, or 405).

At block 820, the forwarding plane receives a request from a control plane to update the FRR NH, wherein the request includes an attribute (e.g., as part of block 230, 330, or 430). At block 825, the forwarding plane, in response to receiving the request to update the FRR NH, determines whether to continue using the SNH for forwarding the IP traffic towards the third network device or to revert back to using the PNH for forwarding the IP traffic towards the second network device based whether the attribute included in the request matches the attribute of the FRR NH (e.g., as part of block 235, 335, or 435).

Figure 9A:
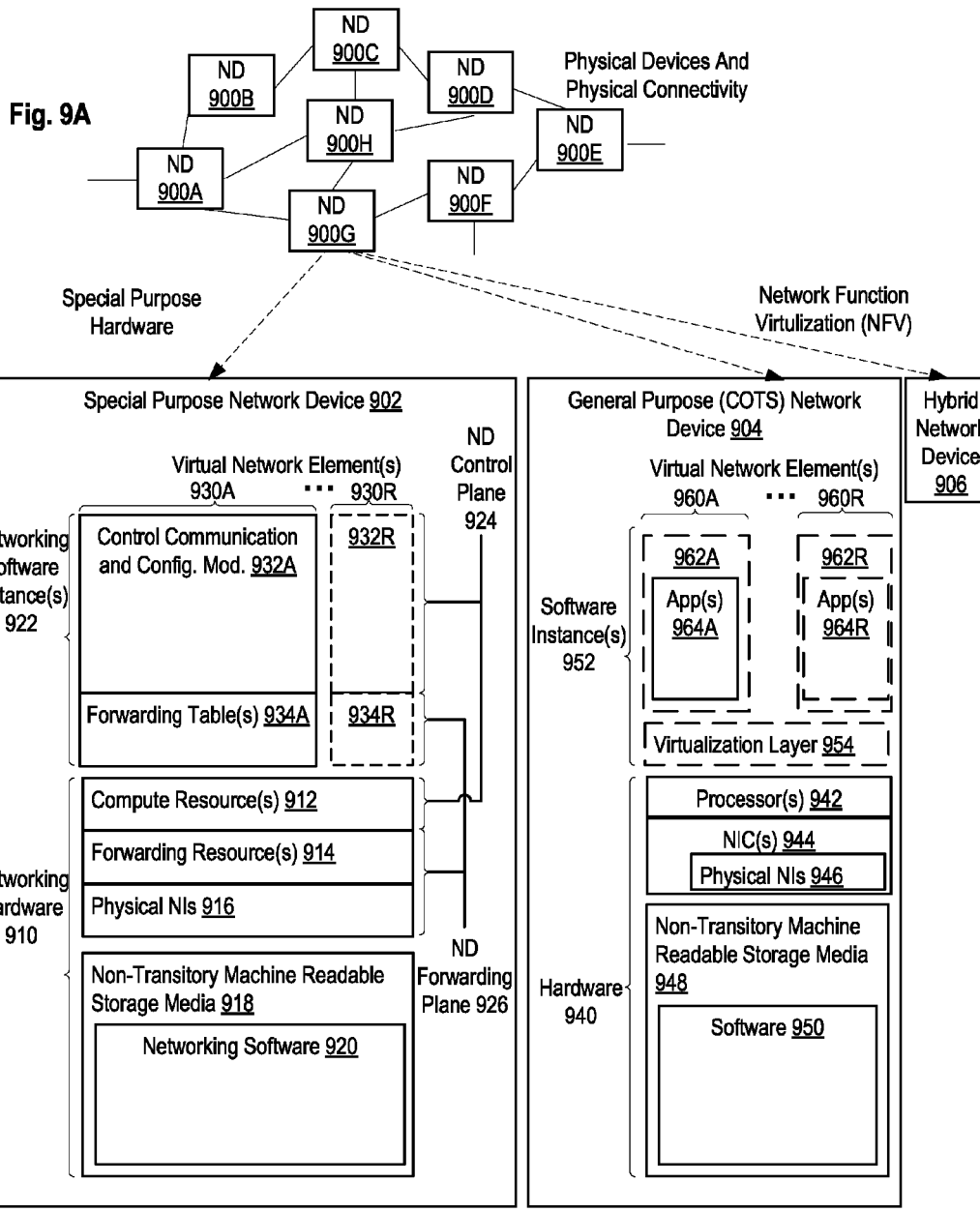
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code which when executed by networking hardware 910, causes networking hardware 910 to perform operations of one or more embodiments of the present invention as part networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
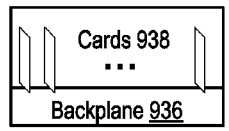
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case:
1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R— e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

Software 950 can include code which when executed by processor(s) 942, cause processor(s) 942 to perform operations of one or more embodiments of the present invention as part software containers 962A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access contents and/or services. Such contents and/or services are typically provided by one or more servers (not shown) belonging to a service/contents provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
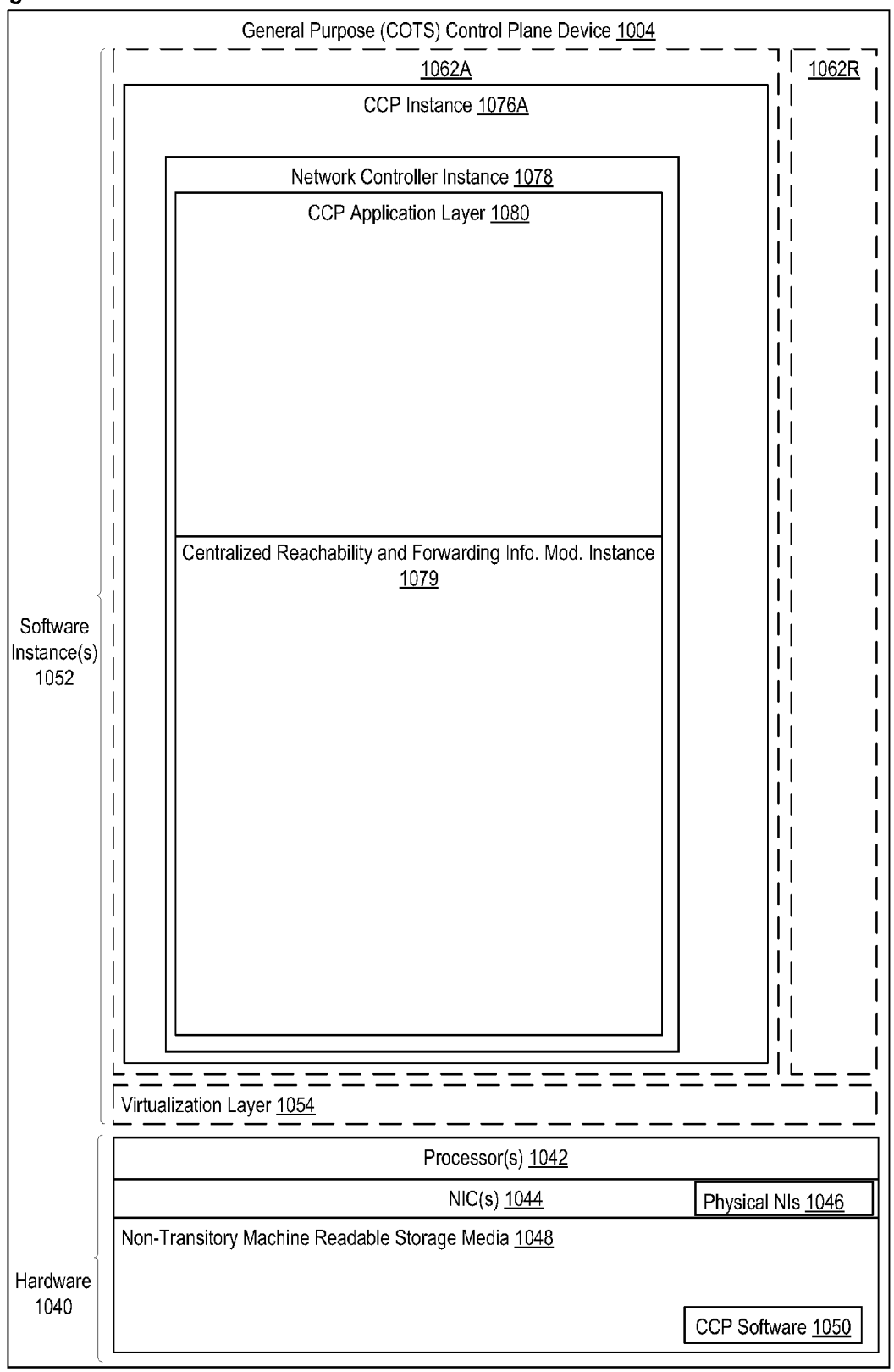
FIG. 10 illustrates a general purpose control plane device with centralized control plane (CCP) software), according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method of a control plane in a first network device for maintaining a plurality of fast reroute (FRR) next hops (NHs), while enabling a forwarding plane of the first network device to identify where the control plane of the first device is out of synchronization and providing stale FRR NH information, wherein the first network device is communicatively coupled to a plurality of other network devices, the method comprising:
    generating a first FRR NH comprising of a first primary next hop (PNH), a first secondary next hop (SNH), and a first attribute, wherein the first PNH includes forwarding information that causes Internet Protocol (IP) traffic to be forwarded towards a second network device via a plurality of paths, and wherein the first SNH includes forwarding information that causes the IP traffic to be forwarded towards a third network device;
    sending a first request to the forwarding plane to generate a second FRR NH comprising of a second PNH, a second SNH, and a second attribute, wherein the second PNH, the second SNH, and the second attribute are to be generated based on the first PNH, the first SNH, and the first attribute, respectively, included in the first request;
    updating contents of the first FRR NH; and
    sending a second request to the forwarding plane to update the second FRR NH, wherein the second PNH and the second SNH are to be updated based on the first PNH and the first SNH, respectively, included in the second request, wherein the second request causes the forwarding plane to determine whether to revert back to using the second PNH for forwarding the IP traffic towards the second network device based on whether the first attribute included in the second request is different from the second attribute of the second FRR NH, where the first attribute being the same as the second attribute indicates duplicative FRR NH information.

2. The method of claim 1, wherein:
updating the contents of the first FRR NH comprises:
    receiving a notification from the forwarding plane indicating the second network device is not operational,
    in response to determining the notification is not a false alarm, maintaining the first attribute without updating it with a different value, and
    in response to determining the IP traffic cannot be forwarded to the second network device via a first path of the plurality of paths, updating the first PNH to avoid forwarding the IP traffic to the second network device via the first path, wherein updating the first PNH causes the second request to be sent to the forwarding plane; and wherein
sending the second request comprises sending second request that includes the first attribute that has not been updated with the different value, wherein the second request causes the forwarding plane, in response to determining the first attribute included in the second request is not different from the second attribute of the second FRR NH, to not revert back to using the second PNH for forwarding the IP traffic towards the second network device.

3. The method of claim 1, wherein:
updating the contents of the first FRR NH comprises:
    receiving a notification from the forwarding plane indicating the second network device is not operational, and
    in response to determining the notification is a false alarm, updating the first attribute with a different value, wherein updating the first attribute with a different value causes the second request to be sent to the forwarding plane; and wherein
sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

4. The method of claim 3, wherein:
updating the first attribute with the different value comprises:
receiving a fourth request to update the first FRR NH, wherein the fourth request includes a third attribute that is newer than the first attribute,
in response to determining the third attribute is newer than the first attribute, updating the first attribute with the third attribute,
receiving a fifth request to update the first FRR NH, wherein the fifth request includes a fourth attribute that is not newer than the first attribute, and
in response to determining the fourth attribute is not newer than the first attribute, maintaining the first attribute without updating it with the fourth attribute; and wherein
sending the second request that includes the first attribute that has been updated with the different value comprises:
sending the second request that includes the first attribute that has been updated with the third attribute.

5. The method of claim 1, wherein:
updating the contents of the first FRR NH comprises:
after a hardware failover, updating the first attribute with a different value, wherein updating the first attribute with a different value causes the second request to be sent to the forwarding plane; and wherein
sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

6. A first network device for maintaining a plurality of fast reroute (FRR) next hops (NHs), the first network device implementing a process in the control plane to enable a forwarding plane of the first network device to identify where the control plane of the first device is out of synchronization and providing stale FRR NH information, wherein the first network device is communicatively coupled to a plurality of other network devices, the first network device comprising:
a set of one or more processors; and
a non-transitory machine-readable storage medium containing code, which when executed by the set of one or more processors, causes the first network device to:
generate a first FRR NH comprising of a first primary next hop (PNH), a first secondary next hop (SNH), and a first attribute, wherein the first PNH includes forwarding information that causes Internet Protocol (IP) traffic to be forwarded towards a second network device via a plurality of paths, and wherein the first SNH includes forwarding information that causes the IP traffic to be forwarded towards a third network device;
send a first request to the forwarding plane to generate a second FRR NH comprising of a second PNH, a second SNH, and a second attribute, wherein the second PNH, the second SNH, and the second attribute are to be generated based on the first PNH, the first SNH, and the first attribute, respectively, included in the first request;
update contents of the first FRR NH; and
send a second request to the forwarding plane to update the second FRR NH, wherein the second PNH and the second SNH are to be updated based on the first PNH and the first SNH, respectively, included in the second request, wherein the second request causes the forwarding plane to determine whether to revert back to using the second PNH for forwarding the IP traffic towards the second network device based on whether the first attribute included in the second request is different from the second attribute of the second FRR NH, where the first attribute being the same as the second attribute indicates duplicative FRR NH information.

7. The first network device of claim 6, wherein:
updating the contents of the first FRR NH comprises the first network device to:
receive a notification from the forwarding plane indicating the second network device is not operational,
in response to determining the notification is not a false alarm, maintain the first attribute without updating it with a different value, and
in response to determining the IP traffic cannot be forwarded to the second network device via a first path of the plurality of paths, update the first PNH to avoid forwarding the IP traffic to the second network device via the first path, wherein updating the first PNH causes the second request to be sent to the forwarding plane; and wherein
sending the second request comprises the first network device to send second request that includes the first attribute that has not been updated with the different value, wherein the second request causes the forwarding plane, in response to determining the first attribute included in the second request is not different from the second attribute of the second FRR NH, to not revert back to using the second PNH for forwarding the IP traffic towards the second network device.

8. The first network device of claim 6, wherein:
updating the contents of the first FRR NH comprises the first network device to:
receive a notification from the forwarding plane indicating the second network device is not operational, and
in response to determining the notification is a false alarm, update the first attribute with a different value, wherein updating the first attribute with a different value causes the second request to be sent to the forwarding plane; and wherein
sending the second request comprises the first network device to send the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

9. The first network device of claim 8, wherein:
updating the first attribute with the different value comprises the first network device to:
receive a fourth request to update the first FRR NH, wherein the fourth request includes a third attribute that is newer than the first attribute,
in response to determining the third attribute is newer than the first attribute, update the first attribute with the third attribute, receive a fifth request to update the first FRR NH, wherein the fifth request includes a fourth attribute that is not newer than the first attribute, and in response to determining the fourth attribute is not newer than the first attribute, maintain the first attribute without updating it with the fourth attribute; and wherein sending the second request that includes the first attribute that has been updated with the different value comprises the first network device to:

send the second request that includes the first attribute that has been updated with the third attribute.

10. The first network device of claim 6, wherein:
updating the contents of the first FRR NH comprises the first network device to:
  after a hardware failover, update the first attribute with a different value, wherein updating the first attribute with a different value causes the second request to be sent to the forwarding plane; and wherein
sending the second request comprises the first network device to send the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

11. A non-transitory machine-readable storage medium having computer code stored therein, which when executed by a set of one or more processors of a first network device implement a process of a control plane for maintaining a plurality of fast reroute (FRR) next hops (NHs), the process in the control plane to enable a forwarding plane of the first network device to identify where the control plane of the first device is out of synchronization and providing stale FRR NH information, wherein the first network device is communicatively coupled to a plurality of other network devices, causes the first network device to perform operations comprising:

generating a first FRR NH comprising of a first primary next hop (PNH), a first secondary next hop (SNH), and a first attribute, wherein the first PNH includes forwarding information that causes Internet Protocol (IP) traffic to be forwarded towards a second network device via a plurality of paths, and wherein the first SNH includes forwarding information that causes the IP traffic to be forwarded towards a third network device;

sending a first request to the forwarding plane to generate a second FRR NH comprising of a second PNH, a second SNH, and a second attribute, wherein the second PNH, the second SNH, and the second attribute are to be generated based on the first PNH, the first SNH, and the first attribute, respectively, included in the first request;

updating contents of the first FRR NH; and sending a second request to the forwarding plane to update the second FRR NH, wherein the second PNH and the second SNH are to be updated based on the first PNH and the first SNH, respectively, included in the second request, wherein the second request causes the forwarding plane to determine whether to revert back to using the second PNH for forwarding the IP traffic towards the second network device based on whether the first attribute included in the second request is different from the second attribute of the second FRR NH, where the first attribute being the same as the second attribute indicates duplicative FRR NH information.

12. The non-transitory machine-readable storage medium of claim 11, wherein:
updating the contents of the first FRR NH comprises:
  receiving a notification from the forwarding plane indicating the second network device is not operational,
  in response to determining the notification is not a false alarm, maintaining the first attribute without updating it with a different value, and
  in response to determining the IP traffic cannot be forwarded to the second network device via a first path of the plurality of paths, updating the first PNH to avoid forwarding the IP traffic to the second network device via the first path, wherein updating the first PNH causes the second request to be sent to the forwarding plane; and wherein
sending the second request comprises sending second request that includes the first attribute that has not been updated with the different value, wherein the second request causes the forwarding plane, in response to determining the first attribute included in the second request is not different from the second attribute of the second FRR NH, to not revert back to using the second PNH for forwarding the IP traffic towards the second network device.

13. The non-transitory machine-readable storage medium of claim 11, wherein:
updating the contents of the first FRR NH comprises:
  receiving a notification from the forwarding plane indicating the second network device is not operational, and
  in response to determining the notification is a false alarm, updating the first attribute with a different value, wherein updating the first attribute with a different value causes the second request to be sent to the forwarding plane; and wherein
sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

14. The non-transitory machine-readable storage medium of claim 13, wherein:
updating the first attribute with the different value comprises:
  receiving a fourth request to update the first FRR NH, wherein the fourth request includes a third attribute that is newer than the first attribute,
  in response to determining the third attribute is newer than the first attribute, updating the first attribute with the third attribute,
  receiving a fifth request to update the first FRR NH, wherein the fifth request includes a fourth attribute that is not newer than the first attribute, and
  in response to determining the fourth attribute is not newer than the first attribute, maintaining the first attribute without updating it with the fourth attribute; and wherein sending the second request that includes the first attribute that has been updated with the different value comprises:
sending the second request that includes the first attribute that has been updated with the third attribute.

15. The non-transitory machine-readable storage medium of claim 11, wherein:
updating the contents of the first FRR NH comprises:
after a hardware failover, updating the first attribute with a different value, wherein updating the first attribute with a different value causes the second request to be sent to the forwarding plane; and wherein
sending the second request comprises sending the second request that includes the first attribute that has been updated with the different value, wherein the second request causes the forwarding plane, in response to determining the first attribute included in the second request is different from the second attribute of the second FRR NH, to revert back to using the second PNH for forwarding the IP traffic towards the second network device.

16. A method in a forwarding plane of a first network device for maintaining a plurality of fast reroute (FRR) next hops (NHs), the method to identify where a control plane of the first device is out of synchronization and providing stale FRR NH information, wherein the first network device is communicatively coupled to a plurality of other network devices, the method comprising:
generating a FRR NH comprising of a primary next hop (PNH), a secondary next hop (SNH), and a first attribute, wherein the PNH includes forwarding information that causes Internet Protocol (IP) traffic to be forwarded towards a second network device, wherein the SNH includes forwarding information that causes the IP traffic to be forwarded towards a third network device;
detecting the second network device is not operational;
in response to detecting the second network device is not operational, causing the FRR NH to switch from using the PNH for forwarding the IP traffic towards the second network device to using the SNH for forwarding the IP traffic towards the third network device;
receiving a request from a control plane to update the FRR NH, wherein the request includes a second attribute; and
in response to receiving the request to update the FRR NH, determining whether to continue using the SNH for forwarding the IP traffic towards the third network device or to revert back to using the PNH for forwarding the IP traffic towards the second network device based whether the second attribute included in the request matches the first attribute of the FRR NH, where the first attribute being the same as the second attribute indicates duplicative FRR NH information.

17. The method of claim 16, further comprising:
in response to detecting the second network device is not operational, sending a notification to the control plane indicating the second network device is not operational, wherein the control plane determines that the notification is not a false alarm and sends the request to update the FRR NH which includes the first attribute of the FRR NH that matches with the second attribute; and
in response to determining the request to update the FRR NH includes the first attribute that matches the second attribute, determining not to cause the FRR NH to revert from using the SNH for forwarding the IP traffic towards the third network device back to using the PNH for forwarding the IP traffic towards the second network device.

18. The method of claim 16, further comprising:
in response to detecting the second network device is not operational, sending a notification to the control plane indicating the second network device is not operational, wherein the control plane determines that the notification is a false alarm and sends the request to update the FRR NH which includes the first attribute that does not match the second attribute; and
in response to determining the request to update the FRR NH includes the first attribute that does not match the second attribute, determining to cause the FRR NH to revert from using the SNH for forwarding the IP traffic towards the third network device back to using the PNH for forwarding the IP traffic towards the second network device.

19. The method of claim 16, further comprising:
maintaining state information of the second network device, wherein the state information indicates whether the second network device is operational; and wherein
in response to receiving the request to update the FRR NH, determining whether to continue using the SNH for forwarding the IP traffic towards the third network device or to revert back to using the PNH for forwarding the IP traffic towards the second network device is further based whether the state information indicates the second network device is operational.

20. A first network device implementing a forwarding plane for maintaining a plurality of fast reroute (FRR) next hops (NHs), the first network device implementing a method to identify where a control plane of the first device is out of synchronization and providing stale FRR NH information, wherein the first network device is communicatively coupled to a plurality of other network devices, the first network device comprising:
a set of one or more processors; and
a non-transitory machine-readable storage medium containing code, which when executed by the set of one or more processors, causes the first network device to:
generate a FRR NH comprising of a primary next hop (PNH), a secondary next hop (SNH), and a first attribute, wherein the PNH includes forwarding information that causes Internet Protocol (IP) traffic to be forwarded towards a second network device, wherein the SNH includes forwarding information that causes the IP traffic to be forwarded towards a third network device;
detect the second network device is not operational;
in response to detecting the second network device is not operational, cause the FRR NH to switch from using the PNH for forwarding the IP traffic towards the second network device to using the SNH for forwarding the IP traffic towards the third network device;
receive a request from a control plane to update the FRR NH, wherein the request includes a second attribute; and
in response to receiving the request to update the FRR NH, determine whether to continue using the SNH for forwarding the IP traffic towards the third network device or to revert back to using the PNH for forwarding the IP traffic towards the second network device based whether the second attribute included in the request matches the first attribute of the FRR NH, where the first attribute being the same as the second attribute indicates duplicative FRR NH information.

21. The first network device of claim 20, wherein the non-transitory machine-readable storage medium further contains code, which when executed by the set of one or more processors, causes the first network device to:
in response to detecting the second network device is not operational, send a notification to the control plane indicating the second network device is not operational, wherein the control plane determines that the notification is not a false alarm and sends the request to update the FRR NH which includes the first attribute that matches the second attribute; and
in response to determining the request to update the FRR NH includes the first attribute that matches the second attribute, determine not to cause the FRR NH to revert from using the SNH for forwarding the IP traffic towards the third network device back to using the PNH for forwarding the IP traffic towards the second network device.

22. The first network device of claim 20, wherein the non-transitory machine-readable storage medium further contains code, which when executed by the set of one or more processors, causes the first network device to:
in response to detecting the second network device is not operational, send a notification to the control plane indicating the second network device is not operational, wherein the control plane determines that the notification is a false alarm and sends the request to update the FRR NH which includes the first attribute that does not match the second attribute; and
in response to determining the request to update the FRR NH includes the first attribute that does not match the second attribute, determine to cause the FRR NH to revert from using the SNH for forwarding the IP traffic towards the third network device back to using the PNH for forwarding the IP traffic towards the second network device.

23. The first network device of claim 20, wherein the non-transitory machine-readable storage medium further contains code, which when executed by the set of one or more processors, causes the first network device to:
maintain state information of the second network device, wherein the state information indicates whether the second network device is operational; and wherein
in response to receiving the request to update the FRR NH, determine whether to continue using the SNH for forwarding the IP traffic towards the third network device or to revert back to using the PNH for forwarding the IP traffic towards the second network device further based whether the state information indicates the second network device is operational.

24. A non-transitory machine-readable storage medium having computer code stored therein, which when executed by a set of one or more processors of a first network device implementing a method in a forwarding plane for maintaining a plurality of fast reroute (FRR) next hops (NHs), the method to identify where a control plane of the first device is out of synchronization and providing stale FRR NH information, wherein the first network device is communicatively coupled to a plurality of other network devices, causes the first network device to perform operations comprising:
generating a FRR NH comprising of a primary next hop (PNH), a secondary next hop (SNH), and a first attribute, wherein the PNH includes forwarding information that causes Internet Protocol (IP) traffic to be forwarded towards a second network device, wherein the SNH includes forwarding information that causes the IP traffic to be forwarded towards a third network device;
detecting the second network device is not operational;
in response to detecting the second network device is not operational, causing the FRR NH to switch from using the PNH for forwarding the IP traffic towards the second network device to using the SNH for forwarding the IP traffic towards the third network device;
receiving a request from a control plane to update the FRR NH, wherein the request includes a second attribute; and
in response to receiving the request to update the FRR NH, determining whether to continue using the SNH for forwarding the IP traffic towards the third network device or to revert back to using the PNH for forwarding the IP traffic towards the second network device based whether the first attribute included in the request matches the second attribute, where the first attribute being the same as the second attribute indicates duplicative FRR NH information.

25. The non-transitory machine-readable storage medium of claim 24, further comprising:
in response to detecting the second network device is not operational, sending a notification to the control plane indicating the second network device is not operational, wherein the control plane determines that the notification is not a false alarm and sends the request to update the FRR NH which includes the first attribute that matches the second attribute; and
in response to determining the request to update the FRR NH includes the first attribute that matches the second attribute of the FRR NH, determining not to cause the FRR NH to revert from using the SNH for forwarding the IP traffic towards the third network device back to using the PNH for forwarding the IP traffic towards the second network device.

26. The non-transitory machine-readable storage medium of claim 24, further comprising:
in response to detecting the second network device is not operational, sending a notification to the control plane indicating the second network device is not operational, wherein the control plane determines that the notification is a false alarm and sends the request to update the FRR NH which includes the first attribute that does not match the second attribute of the FRR NH; and
in response to determining the request to update the FRR NH includes the first attribute that does not match the second attribute of the FRR NH, determining to cause the FRR NH to revert from using the SNH for forwarding the IP traffic towards the third network device back to using the PNH for forwarding the IP traffic towards the second network device.

27. The non-transitory machine-readable storage medium of claim 24, further comprising:
maintaining state information of the second network device, wherein the state information indicates whether the second network device is operational; and wherein
in response to receiving the request to update the FRR NH, determining whether to continue using the SNH for forwarding the IP traffic towards the third network device or to revert back to using the PNH for forwarding the IP traffic towards the second network device is further based whether the state information indicates the second network device is operational.

* * * * *